(12) United States Patent
Yabuta et al.

(10) Patent No.: US 10,888,934 B2
(45) Date of Patent: Jan. 12, 2021

(54) MACHINING SYSTEM AND MACHINING METHOD

(71) Applicant: HIRATA CORPORATION, Kumamoto (JP)

(72) Inventors: Toshimi Yabuta, Kumamoto (JP); Hirohiko Sakanashi, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 0 days.

(21) Appl. No.: 16/356,248

(22) Filed: Mar. 18, 2019

(65) Prior Publication Data

US 2019/0299303 A1    Oct. 3, 2019

(30) Foreign Application Priority Data

Mar. 29, 2018  (JP) .................................. 2018-065408

(51) Int. Cl.
*B23C 3/12* (2006.01)
*B23Q 15/14* (2006.01)
(Continued)

(52) U.S. Cl.
CPC .................. *B23C 3/12* (2013.01); *B23C 5/14* (2013.01); *B23Q 3/1543* (2013.01);
(Continued)

(58) Field of Classification Search
CPC ... B23C 3/12; B23C 2210/56; B23C 2220/20; B23C 2220/40; B23Q 2240/002
See application file for complete search history.

(56) References Cited

U.S. PATENT DOCUMENTS

| 4,960,352 A | 10/1990 | Kishi |
| 7,476,065 B2 | 1/2009 | Suzuki et al. |

(Continued)

FOREIGN PATENT DOCUMENTS

| CN | 105209221 A | 12/2015 |
| JP | H-08-141893 A | 6/1996 |

(Continued)

OTHER PUBLICATIONS

Extended European Search Report dated Jun. 27, 2019, issued by the European Patent Office in corresponding European Application No. 19159565.1. (7 pages).

(Continued)

*Primary Examiner* — Alan Snyder
(74) *Attorney, Agent, or Firm* — Buchanan Ingersoll & Rooney PC

(57) ABSTRACT

A machining system includes a machining unit and a moving apparatus configured to move the machining unit. The machining unit includes a rotating tool for rotating about an axis in a vertical direction, an upper surface abutting member configured to be abutted against an upper surface of a work, an end face abutting member configured to be abutted against an end face of the work between an upper edge and an lower edge of the work, and a vertical moving unit configured to change a position of the upper surface abutting member in the vertical direction with respect to the rotating tool. The rotating tool includes a machining portion main body, a first machining portion provided on a lower side of the machining portion main body, and a second machining portion provided on an upper side of the machining portion main body.

11 Claims, 20 Drawing Sheets

(51) Int. Cl.

| | | |
|---|---|---|
| *B23Q 9/00* | (2006.01) | |
| *B23Q 3/154* | (2006.01) | |
| *B23C 5/14* | (2006.01) | |
| *B23Q 17/24* | (2006.01) | |
| *B23Q 9/02* | (2006.01) | |
| *B23Q 17/20* | (2006.01) | |

(52) U.S. Cl.
CPC ............ *B23Q 9/0014* (2013.01); *B23Q 9/02* (2013.01); *B23Q 15/14* (2013.01); *B23Q 17/20* (2013.01); *B23Q 17/2428* (2013.01); *B23C 2210/084* (2013.01); *B23C 2220/16* (2013.01); *B23C 2220/20* (2013.01); *B23C 2220/40* (2013.01); *B23C 2255/08* (2013.01); *B23C 2270/14* (2013.01); *B23Q 2240/002* (2013.01)

(56) References Cited

U.S. PATENT DOCUMENTS

| | | | |
|---|---|---|---|
| 9,956,624 | B2 | 5/2018 | Takahashi |
| 2014/0363251 | A1* | 12/2014 | Dieckilman ............ B23C 3/126 409/179 |

FOREIGN PATENT DOCUMENTS

| | | | |
|---|---|---|---|
| JP | H08-243826 | A | 9/1996 |
| JP | 2571322 | Y2 | 5/1998 |
| JP | 2001-205539 | A | 7/2001 |
| JP | 2001205539 | A * | 7/2001 |
| JP | 2007-273882 | A | 10/2007 |
| JP | 2013-052482 | A | 3/2013 |
| JP | 5481919 | B2 | 4/2014 |
| JP | 5770540 | B2 | 8/2015 |
| JP | 5778792 | B2 | 9/2015 |
| KR | 1992-0000068 | | 1/1992 |
| KR | 10-2006-0046313 | A | 5/2006 |
| KR | 2012 0040393 | A | 4/2012 |

OTHER PUBLICATIONS

Office Action dated Mar. 18, 2020, by the Chinese Patent Office in corresponding Chinese Patent Application No. 201910219460.6 and English translation of the Office Action. (16 pages).

Office Action (Notice of Reasons for Refusal) dated Apr. 27, 2020, by the Japanese Patent Office in corresponding Japanese Patent Application No. 2018-065408 and English translation of the Office Action. (10 pages).

Office Action (Notification of Reasons for Refusal) dated May 27, 2020, by the Korean Patent Office in corresponding Korean Patent Application No. 10-2019-0027901 and English translation of the Office Action. (7 pages).

* cited by examiner

MACHINING SYSTEM AND MACHINING METHOD

CROSS-REFERENCE TO RELATED APPLICATION(S)

This application claims priority to and the benefit of Japanese Patent Application No. 2018-065408 filed on Mar. 29, 2018, the entire disclosure of which is incorporated herein by reference.

BACKGROUND OF THE INVENTION

Field of the Invention

The present invention relates to a machining system and a machining method for machining a work.

Description of the Related Art

There is proposed various systems as a machining system that automates machining for a plate-like work. For example, Japanese Patent Nos. 5778792 and 5481919 and Japanese Utility Model Registration No. 2571322 disclose machining systems that perform chamfering for the edge of a work. Japanese Patent No. 5778792 discloses a technique in which when performing chamfering for the edge of a plate-like work while moving a rotating tool, the rotating tool is moved stably by moving the rotating tool while abutting an auxiliary member against the surface of the plate-like work.

In a steel sheet cut by a laser cutter or plasma cutter, an uneven structure (slag) is generated in the periphery of an edge on one side of the steel sheet. In machining for the edge of the work with the uneven structure, if, as described in Japanese Patent No. 5778792, the rotating tool is moved while abutting the auxiliary member against the work surface, the auxiliary member may be caught by the uneven structure to hinder smooth movement of the rotating tool. Furthermore, when machining the edges on both sides of the work, the machining time tends to be long, and it is desired to machine the edges on both sides in a short time.

SUMMARY OF THE INVENTION

The present invention provides a technique capable of efficiently machining the edges of both surfaces of a plate-like work.

According to one aspect of the present invention, there is provided a machining system comprising: a machining unit configured to machine an upper edge and a lower edge of a plate-like work held in a horizontal orientation; and a moving apparatus configured to move the machining unit, the machining unit comprising a rotating tool configured to rotate about an axis in a vertical direction and machine the work, an upper surface abutting member configured to be abutted against an upper surface of the work when machining the work by the rotating tool, an end face abutting member configured to be abutted against an end face of the work between the upper edge and the lower edge when machining the work by the rotating tool, and a vertical moving unit configured to change a position of the upper surface abutting member in the vertical direction with respect to the rotating tool, and the rotating tool comprising a machining portion main body, a first machining portion provided on a lower side of the machining portion main body and configured to machine the upper edge of the work, and a second machining portion provided on an upper side of the machining portion main body and configured to machine the lower edge of the work.

According to another aspect of the present invention, there is provided a machining method of machining a plate-like work held in a horizontal orientation by moving a machining unit while abutting the machining unit against an upper edge and a lower edge of the work, the machining unit comprising a rotating tool configured to rotate about an axis in a vertical direction and machine the work, an upper surface abutting member configured to be abutted against an upper surface of the work when machining the work by the rotating tool, an end face abutting member configured to be abutted against an end face of the work between the upper edge and the lower edge when machining the work by the rotating tool, and a vertical moving unit configured to change a position of the upper surface abutting member in the vertical direction with respect to the rotating tool, and the rotating tool comprising a machining portion main body, a first machining portion provided on a lower side of the machining portion main body and configured to machine the upper edge of the work, and a second machining portion provided on an upper side of the machining portion main body and configured to machine the lower edge of the work, the method comprising: machining the upper edge by the first machining portion while abutting the upper surface abutting member against the upper surface of the work; changing a relative position in the vertical direction between the upper surface abutting member and the second machining portion of the rotating tool by driving the vertical moving unit; and machining the lower edge by the second machining portion while keeping the upper surface abutting member abutted against the upper surface of the work.

Further features of the present invention will become apparent from the following description of exemplary embodiments with reference to the attached drawings.

DESCRIPTION OF THE EMBODIMENTS

Figure 1:
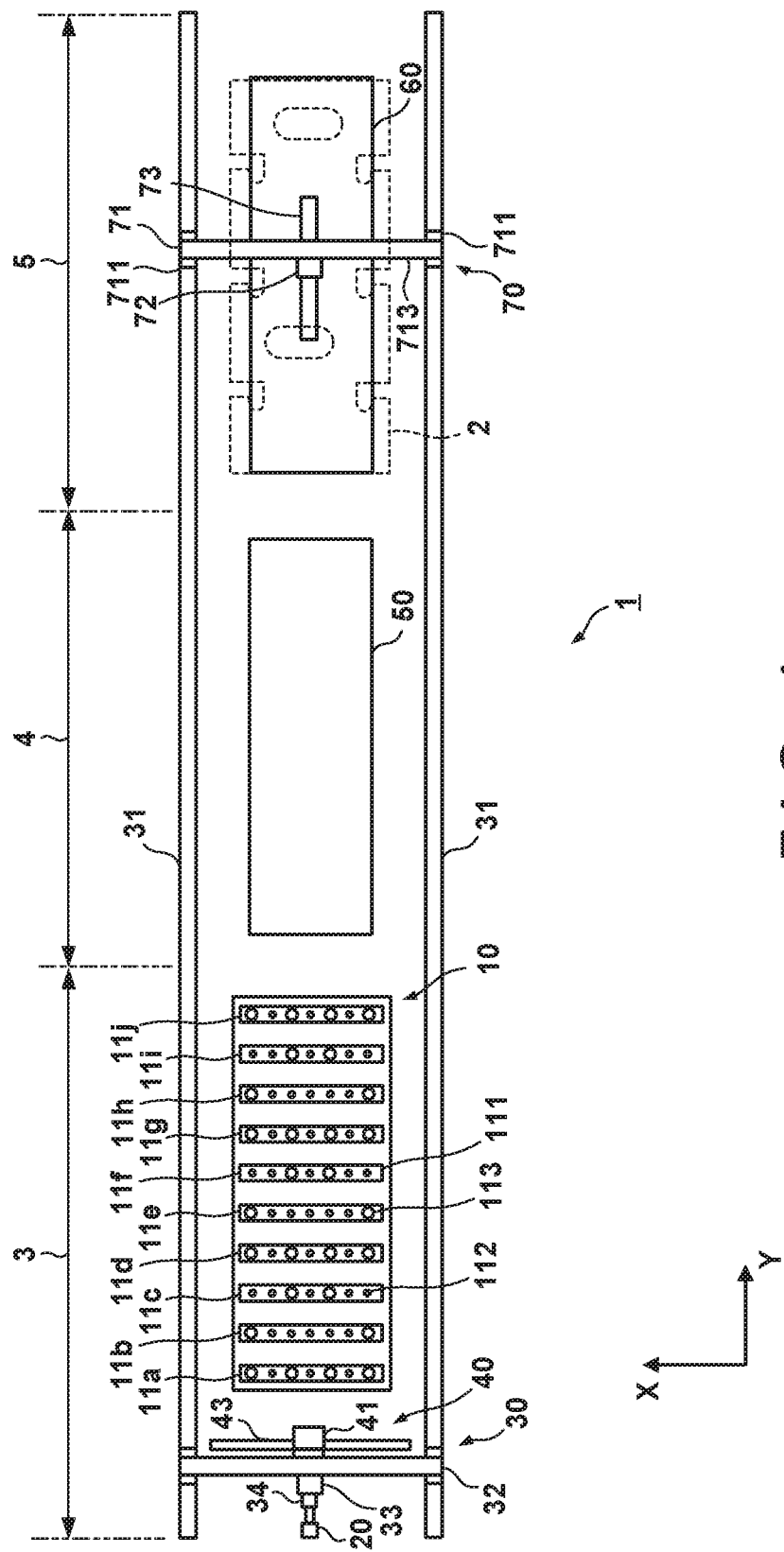
FIG. 1 is a plan view of a machining system according to an embodiment of the present invention.
Figure 2:
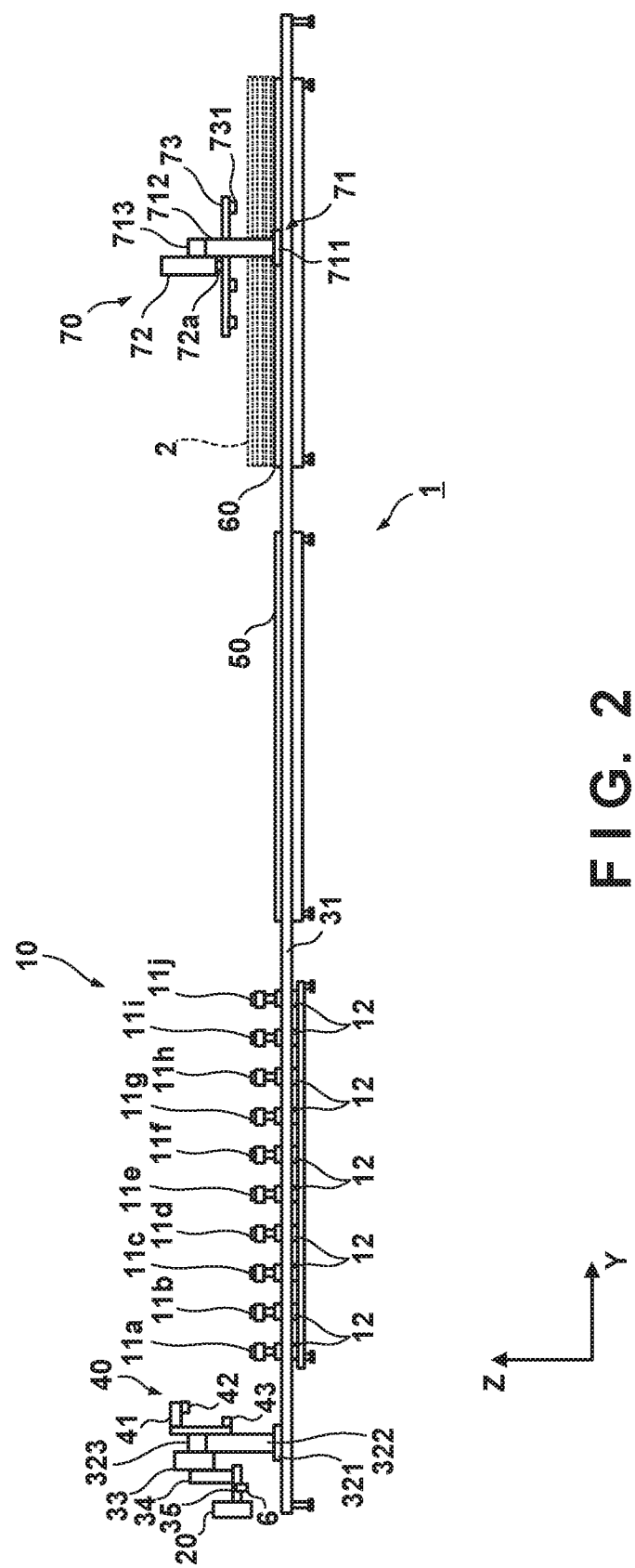
FIG. 2 is a side view of the machining system shown in FIG. 1.

FIG. 1 is a plan view of a machining system 1 according to an embodiment of the present invention. FIG. 2 is a side view of the machining system 1. In FIGS. 1 and 2, arrows X and Y indicate two horizontal directions orthogonal to each other, and an arrow Z indicates a vertical direction. The machining system 1 is a system for performing chamfering (in this embodiment, R chamfering) of the upper and lower edges of a plate-like work 2. The work 2 is, for example, a steel sheet. The machining system 1 is virtually divided into a machining area 3, an unloading area 4, and a loading area 5. These areas 3 to 5 are arranged in the Y direction.

The machining system 1 includes a holding apparatus 10, a machining unit 20, a moving apparatus 30, a detection apparatus 40, placement tables 50 and 60, and a conveyance apparatus 70. The placement table 60 is arranged in the loading area 5, and the unmachined work 2 is placed on the placement table 60. The placement table 50 is arranged in the unloading area 4, and the machined work 2 is placed on the placement table 50, <Holding Apparatus 10>

Figure 3:
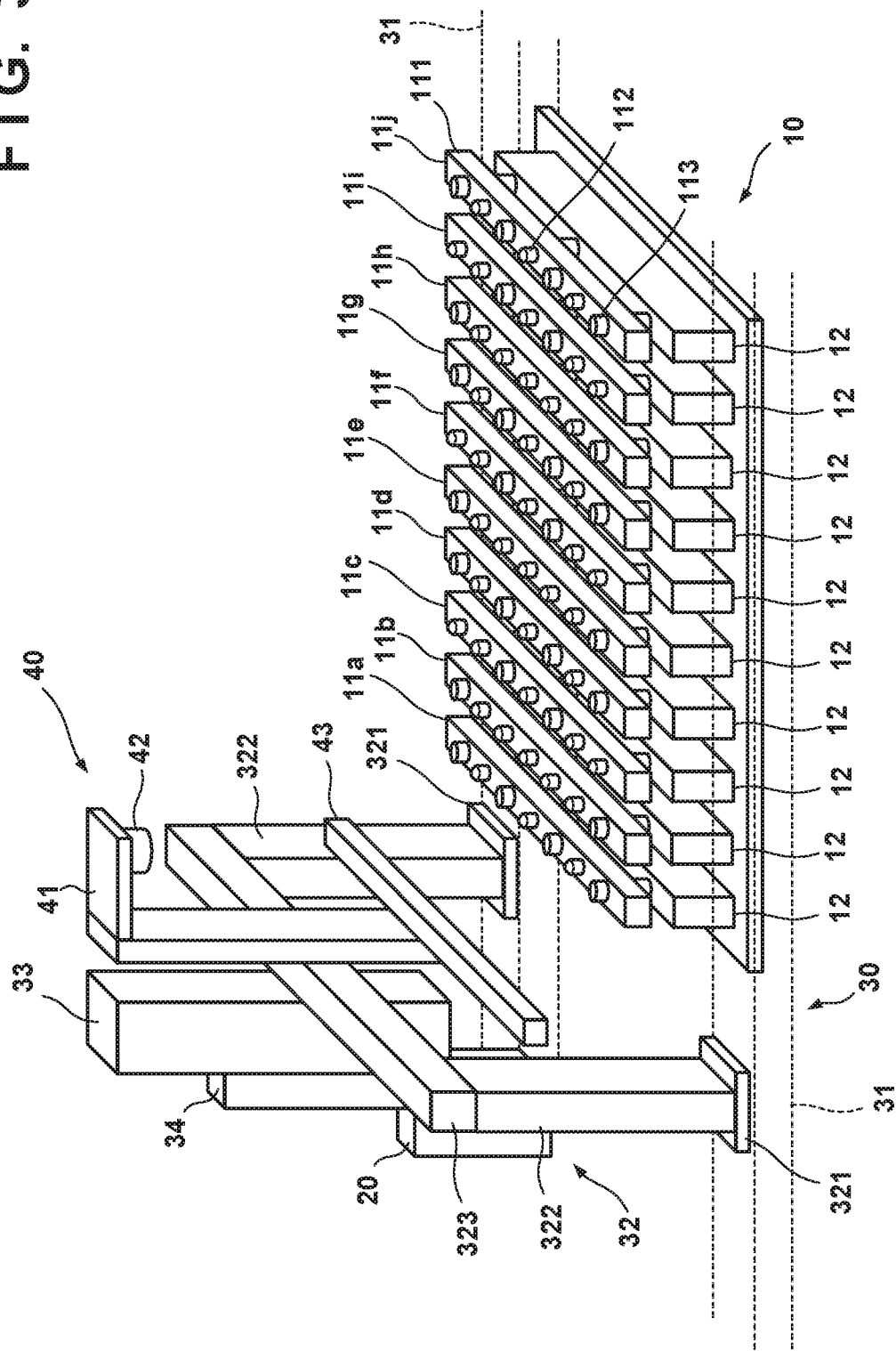
FIG. 3 is a perspective view of a holding apparatus, a machining unit, and a moving apparatus.

The holding apparatus 10 will be described with reference to FIG. 3 in addition to FIGS. 1 and 2. FIG. 3 is a perspective view of the holding apparatus 10, the machining unit 20, and the moving apparatus 30. During machining, the holding apparatus 10 holds the work 2 in a horizontal orientation. The holding apparatus 10 includes a plurality of holding units 11a, to 11j, and moving mechanisms 12 provided for the respective holding units 11a to 11j. When the holding units 11a to 11j are collectively called or any specific holding unit is not indicated, they will be simply referred to as holding units 11 hereinafter.

In this embodiment, the plurality of holding units 11 are arranged in the Y direction in a tie shape. Each holding unit 11 includes a unit main body portion 111 extending in the X direction, at least one support member 112, and at least one chucking body 113. In this embodiment, each unit main body portion 111 is a rod-shaped member having a square section. The support member 112 and the chucking body 113 are provided on the upper surface of the unit main body portion 111.

Each support member 112 projects upward from the upper surface of the unit main body portion 111 and, in this embodiment, has a rounded distal end and a convex surface portion. The work 2 is placed on the convex surface portions of the support members 112 and supported. The rounded distal ends can reduce damage to the work 2. The chucking bodies 113 chuck the work 2. In this embodiment, each chucking body 113 is an electromagnet. However, other kinds of chucking bodies such as a vacuum chuck may be used. In this embodiment, chucking and chucking release of the chucking bodies 113 are controlled for each holding unit 11.

The distal ends of the support members 112 and the upper surfaces of the chucking bodies 113 are located on almost the same horizontal plane (at almost the same height). When the chucking bodies 113 chuck the work 2 placed on the support members 112, it is possible to fix the work 2 in a horizontal orientation.

In this embodiment, the numbers of support members 112 and chucking bodies 113 and their arrangements are different for each holding unit 11. For example, the holding unit 11a includes three support members 112 and four chucking bodies 113 but the holding unit 11b includes five support members 112 and two chucking bodies 113. A support position and a chucking position are different for each portion of the work 2 by changing the numbers of support members 112 and chucking bodies 113 of the holding unit 11 and their arrangements for each portion of the work 2, thereby making it possible to support and chuck the work 2 without unevenness. For all the holding units 11, the numbers of support members 112 and chucking bodies 113 and their arrangement may be the same, as a matter of course.

Note that for the holding units 11a, 11d, 11g, and 11i, the numbers of support members 112 and chucking bodies 113 and their arrangements are the same. For the holding units 11b, 11e, and 11h, the numbers of support members 112 and chucking bodies 113 and their arrangements are the same. Furthermore, for the holding units 11c, 11f, and 11i, the numbers of support members 112 and chucking bodies 113 and their arrangements are the same. By distributively arranging the holding units 11 for which the numbers of support members 112 and chucking bodies 113 and their arrangements are the same, it is possible to support and chuck the work 2 without evenness while decreasing the kinds of holding units 11 for which the numbers of support members 112 and chucking bodies 113 and their arrangements are different.

Each moving mechanism 12 moves each holding unit 11 in the Z direction between a holding position and a retracted position. The moving mechanism 12 is, for example, an electrically-driven cylinder or an air cylinder, and is individually controlled. The holding position is a position for holding the work 2. FIG. 2 shows a case in which all the holding units 11 are located at the holding positions. In this case, the distal ends of all the support members 112 and the upper surfaces of all the chucking bodies 113 are located on almost the same horizontal plane. Therefore, when the chucking bodies 113 chuck the work 2 placed on the support members 112, the work 2 can be fixed in a horizontal orientation. The retracted position is a position separated downward from the holding position, and a position at which interference with a rotating tool 25 (see FIG. 11 and the like to be described later) of the machining unit 20 is avoided during machining. The holding units 11 are located at the holding positions normally, and are individually moved to the retracted positions only when necessary during machining.

Note that in this embodiment, the moving mechanisms 12 are provided respectively in all the holding units 11 and can move the holding units 11 in the vertical direction. However, it is not always necessary to be able to move all the holding units, and there may exist fixed holding units. For example, like the holding units 11a and 11j the holding unit located in an end portion may be fixed at the holding position.

<Moving Apparatus 30>

Referring to FIGS. 1 to 3, the moving apparatus 30 is an apparatus that moves the machining unit 20 to a machining target portion of the work 2 held by the holding apparatus 10. In this embodiment, the moving apparatus 30 three-dimensionally moves the machining unit 20 above the work 2.

The moving apparatus 30 includes a pair of guide members 31 extending in the Y direction and a moving body 32. The pair of guide members 31 are disposed away from each other in the X direction to be located in both side portions of the holding apparatus 10. In this embodiment, the holding apparatus 10 and the placement tables 50 and 60 are arranged in the Y direction, and the pair of guide members 31 extend in the Y direction over them.

The moving body 32 is laid on the pair of guide members 31, and is guided by the guide members 31 to be movable in the Y direction. The moving body 32 includes a pair of sliders 321, a pair of column members 322, and a beam member 323 laid between the pair of column members 322. The sliders 321 are engaged with the guide members 31 to be movable along the guide members 31. The column members 322 are provided upright on the sliders 321, respectively. The beam member 323 extends in the X direction.

The moving body 32 is moved by a driving mechanism (not shown). As the driving mechanism, various driving mechanisms such as a rack and pinion mechanism, a belt transmission mechanism, and a ball and screw mechanism can be adopted. If the rack and pinion mechanism is adopted, for example, a motor with a pinion may be fixed to one of the pair of sliders 321, and a rack may be provided along the guide member 31.

The moving apparatus 30 includes a moving body 33 supported by the moving body 32. The moving body 33 is engaged with the beam member 323 to be movable in the X direction along the beam member 323. The moving body 33 is moved by a driving mechanism (not shown). As the driving mechanism, various driving mechanisms such as a rack and pinion mechanism, a belt transmission mechanism, and a ball and screw mechanism can be adopted.

The moving apparatus 30 includes a moving body 34 supported by the moving body 33. The moving body 34 is engaged with the moving body 33 to be movable in the Z direction along the moving body 33. The moving body 34 is moved by a driving mechanism (not shown). As the driving mechanism, various driving mechanisms such as a rack and pinion mechanism, a belt transmission mechanism, and a ball and screw mechanism can be adopted.

The machining unit 20 is supported by the moving body 34 via a beam 35. The machining unit 20 can be moved in the Z direction by the movement of the moving body 34, moved in the X direction by the movement of the moving body 33, and moved in the Y direction by the movement of the moving body 32. A plate thickness sensor 6 that measures the plate thickness of the work 2 is also supported by the beam 35.

<Machining Unit 20>

Figure 11:
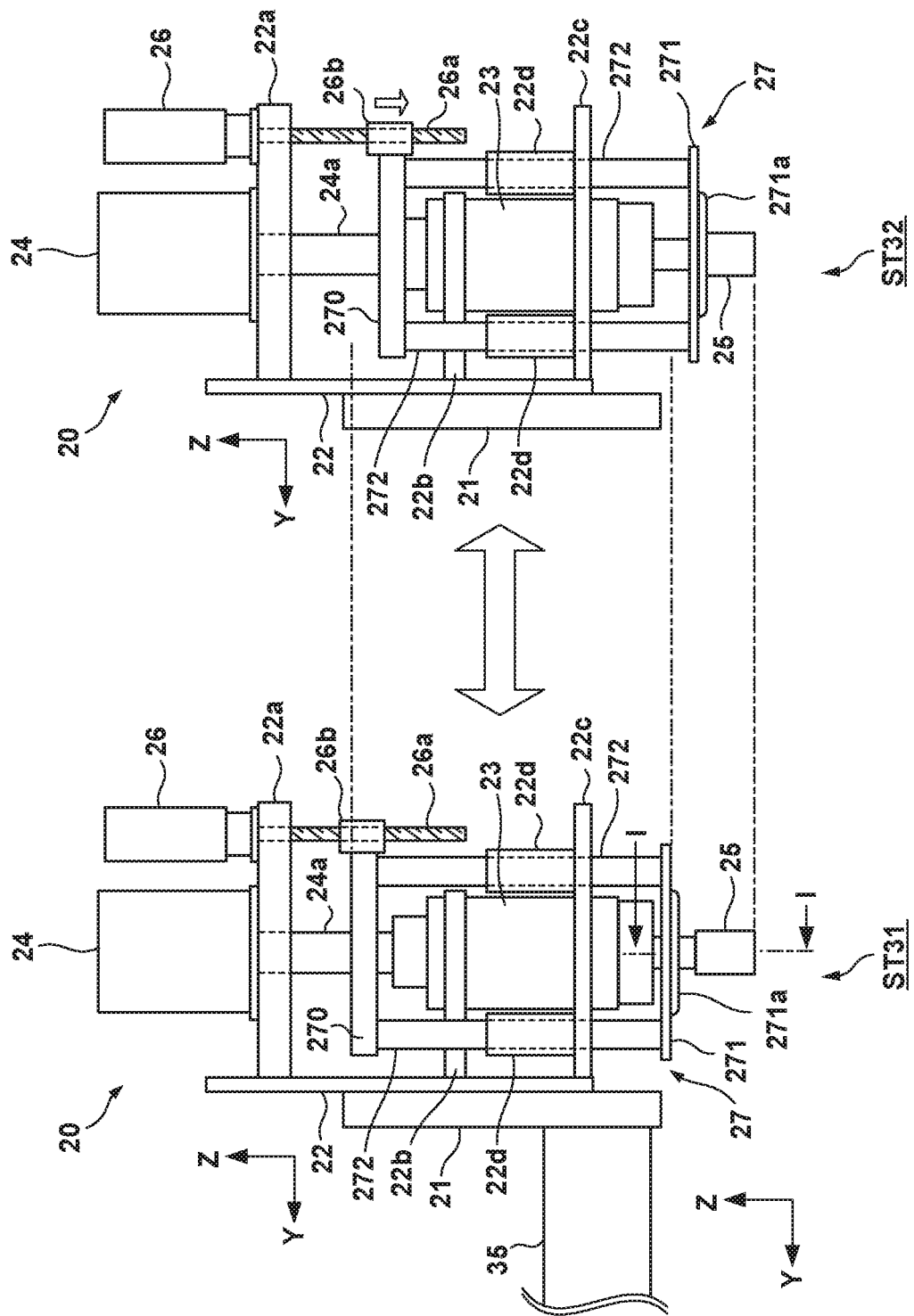
FIG. 11 is an explanatory view of the machining unit.
Figure 12:
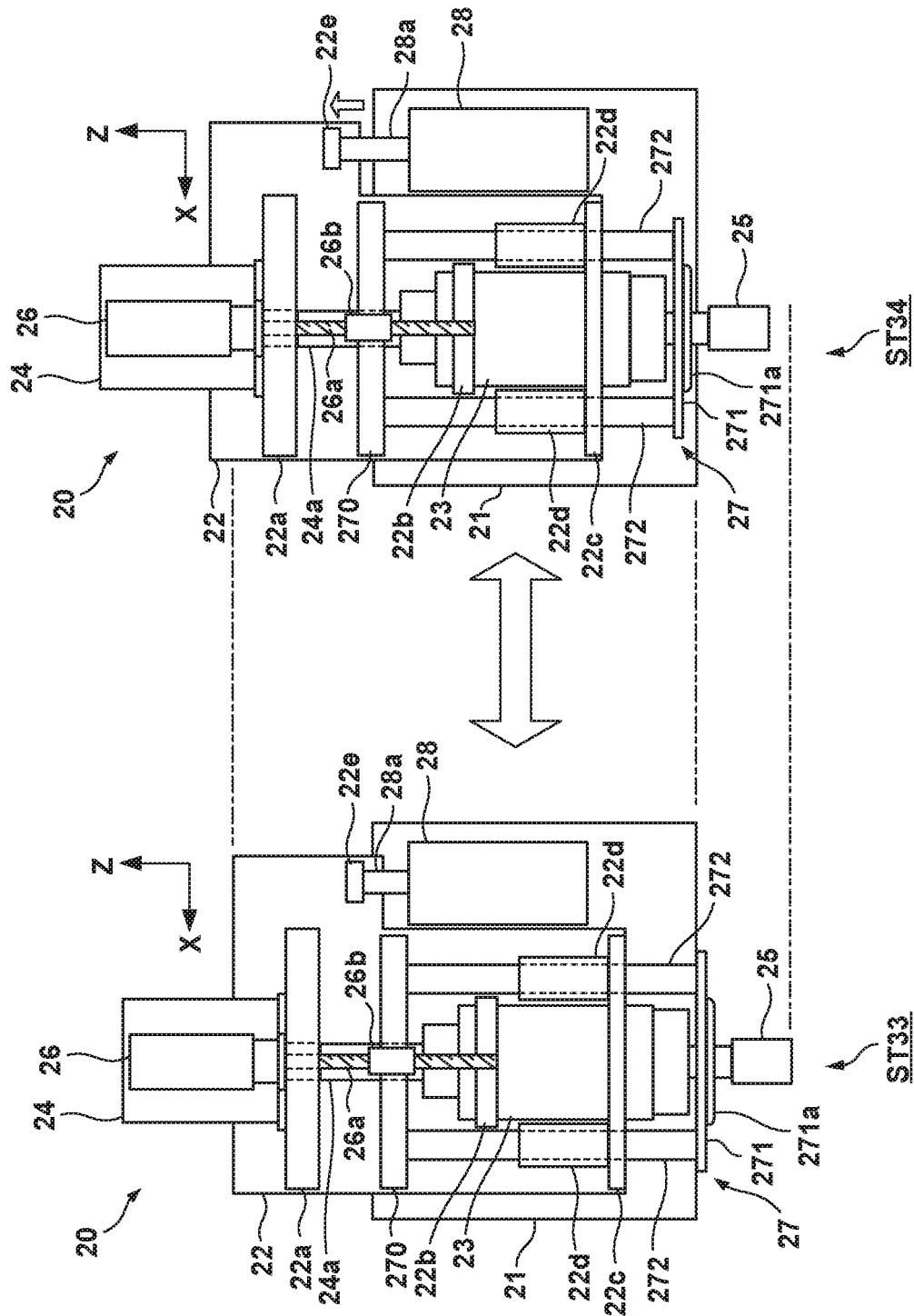
FIG. 12 is an explanatory view of the machining unit.

The machining unit 20 will be described with reference to FIGS. 11 and 12 in addition to FIGS. 1 to 3. FIG. 11 is a side view of the machining unit 20 and an explanatory view of the operation of the machining unit 20. FIG. 12 is a front view of the machining unit 20 and an explanatory view of the operation of the machining unit 20. The machining unit 20 is an apparatus that cuts the work 2 by the rotating tool 25.

The machining unit 20 includes a base plate 21 fixed to the beam 35, and a movable plate 22 supported to be slidable in the Z direction with respect to the base plate 21. The base plate 21 and the movable plate 22 are plate-like members extending on the Z-X plane.

Support plates 22a, 22b, and 22c are fixed to the movable plate 22. The support plates 22a to 22c are plate-like members extending on the X-Y plane. The uppermost plate 22a supports driving units 24 and 26. The driving unit 24 is a unit that rotates the rotating tool 25 about an axis in the Z direction, and includes an electric motor and a decelerator that decelerates the output rotation of the electric motor. An output shaft 24a of the driving unit 24 extends downward in the Z direction through an opening (not shown) formed in the support plate 22a, and is connected to a spindle 23. The support plate 22b supports the middle portion of the spindle 23, and the support plate 22c supports the lower portion of the spindle 23. The rotating tool 25 is connected to the spindle 23, and the driving unit 24, the spindle 23, and the rotating tool 25 are coaxially located.

Figure 14:
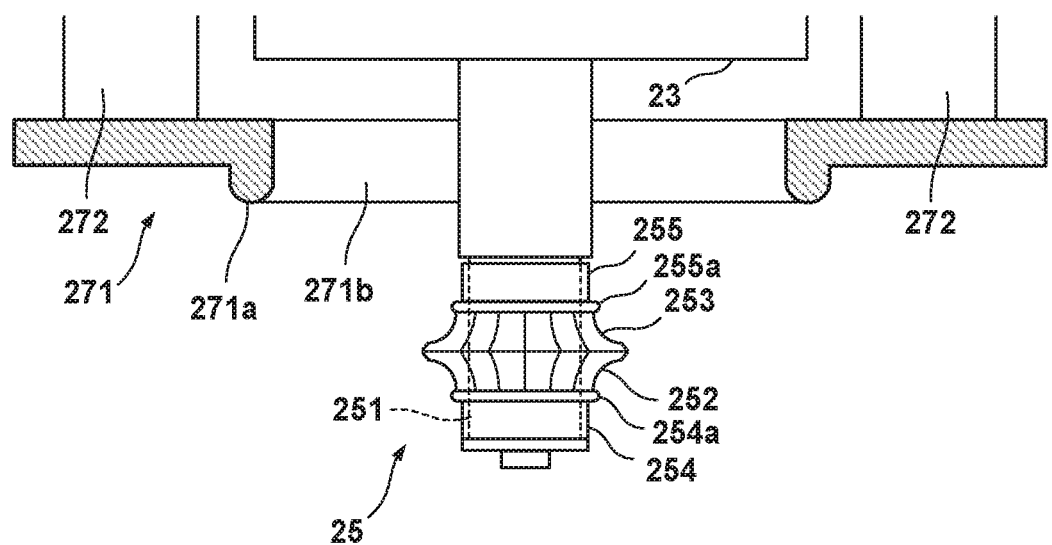
FIG. 14 is a sectional view taken along a line I-I in FIG. 11.

FIG. 14 is a sectional view taken along a line I-I in FIG. 11, and shows the outer appearance of the rotating tool 25. The rotating tool 25 includes a machining portion main body 251, machining portions 252 and 253, and end face abutting members 254 and 255.

The machining portion main body 251 is an axial rod member extending in the Z direction, and rotates about the axis in the Z direction by receiving the driving force of the driving unit 24 via the spindle 23. The machining portions 252 and 253 each include a blade that cuts the work 2, and are fixed to the machining portion main body 251. The machining portion 252 is a portion that cuts the upper edge of the work 2, and has a conical shape which reduces in diameter downward. The machining portion 253 is a portion that cuts the lower edge of the work 2, and has a conical shape which reduces in diameter upward. In this embodiment, to perform R chamfering of the edge of the work 2, the sectional shapes of the peripheral surfaces of the machining portions 252 and 253 have curved surfaces.

The machining portion 252 is provided on the lower side of the machining portion main body 251, and the machining portion 253 is provided on the upper side of the machining portion main body 251. By arranging, on the lower side, the machining portion 252 that cuts the upper edge of the work 2 and arranging, on the upper side, the machining portion 253 that cuts the lower edge of the work 2, it is possible to successively, efficiently machine the upper and lower edges of the work 2, and shorten the full length of the rotating tool 25.

The end face abutting members 254 and 255 are members that are abutted against the end face of the work 2 during machining of the work 2 by the rotating tool 25. The end face abutting members 254 and 255 are tubular members into which the machining portion main body 251 is inserted, and abutting portions 254a and 255a projecting in a radial direction are formed on the peripheral surface at the upper end of the end face abutting member 254 and the peripheral surface at the lower end of the end face abutting member 255.

The end face abutting member 254 is located on the lower side of the machining portion 252. When cutting the upper edge of the work 2 by the machining portion 252, the abutting portion 254a of the end face abutting member 254 is abutted against the end face of the work 2. This can appropriately maintain the cutting depths of the machining portion 252. The cutting depths indicate cutting depths in the work 2 from an upper surface 2a and an end face 2e (both will be described later) of the work 2.

The end face abutting member 255 is located on the upper side of the machining portion 253. When cutting the lower edge of the work 2 by the machining portion 253, the abutting portion 255a of the end face abutting member 255 is abutted against the end face of the work 2. This can appropriately maintain the cutting depths of the machining portion 253. The cutting depths indicate cutting depths in the work 2 from a lower surface 2b and the end face 2e (both will be described later) of the work 2.

Note that an example of the arrangement of the end face abutting members 254 and 255 according to this embodiment is not limited to this. For example, in this embodiment, the end face abutting members 254 and 255 are provided in the rotating tool 25 but may be provided separately from the rotating tool 25. In this case, an end face abutting member for upper edge machining and that for lower edge machining may be formed by a single member.

Referring to FIGS. 11 and 12, a vertical moving unit 26 is a driving unit that vertically moves a vertical moving body 27, and includes an electric motor. The output shaft of the vertical moving unit 26 is connected to the upper end portion of a ball screw 26a. The ball screw 26a extends downward in the Z direction through an opening (not shown) formed in the support plate 22a. A ball nut 26b is engaged with the ball screw 26a. The ball nut 26b is fixed to the vertical moving body 27 (more specifically, an upper plate 270).

When the ball screw 26a is rotated by driving of the vertical moving unit 26, the ball nut 26b moves in the Z direction. As a result, it is possible to change the position of the vertical moving body 27 in the Z direction with respect to the rotating tool 25. States ST31 and ST32 in FIG. 11 show an example in which the vertical moving body 27 is moved in the Z direction. The state ST32 indicates a state in which the vertical moving body 27 is lowered more than in the state ST31, and the position of the vertical moving body 27 with respect to the rotating tool 25 is changed.

Note that in this embodiment, the vertical moving body 27 is vertically moved by the ball screw mechanism. However, another mechanism such as a rack and pinion mechanism can be adopted.

Figure 13:
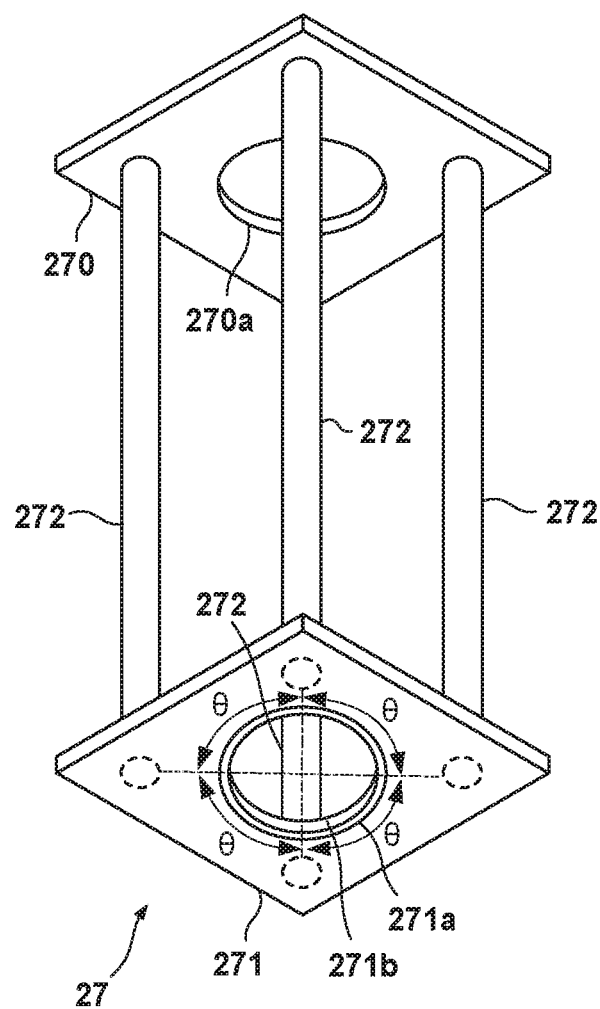
FIG. 13 is a perspective view of a vertical moving body.

The vertical moving body 27 includes the upper plate 270, an upper surface abutting member 271, and a plurality of column members 272 that connect the upper plate 270 and the upper surface abutting member 271. FIGS. 13 and 14 are further referred to. FIG. 13 is a perspective view of the vertical moving body 27 when viewed from the lower side of the upper surface abutting member 271. FIG. 14 is a sectional view taken along the line I-I in FIG. 11.

The upper plate 270 and the upper surface abutting member 271 are both square plate-like members. However, the shapes of the upper plate 270 and the upper surface abutting member 271 are not limited to the square, and may be circular. In the central portion of the upper plate 270, a circular opening portion 270a into which the output shaft 24a of the driving unit 24 can be inserted is formed.

The upper surface abutting member 271 is a member that abuts against the upper surface of the work 2 when machining the work 2 by the rotating tool 25. In the central portion of the upper surface abutting member 271, an insertion portion 271b into which the rotating tool 25 is inserted is formed. In this embodiment, the insertion portion 271b is a circular hole coaxial with the rotating tool 25. In the periphery of the insertion portion 271b on the lower surface of the upper surface abutting member 271, an annular abutting portion 271a is formed to surround the insertion portion 271b. This abutting portion 271a actually abuts against the upper surface of the work 2 when machining the work 2 by the rotating tool 25. The abutting portion 271a projects downward from the lower surface of the upper surface abutting member 271, and has a lower end formed to have a semicircular sectional shape. Since the abutting portion 271a is annular, at least part of the abutting portion 271a can always be abutted against the upper surface of the work 2 regardless of the positional relationship between the rotating tool 5 and the machining target portion. Since the distal end of the abutting portion 271a has a curved surface, the contact area of the abutting portion 271a with the upper surface of the work 2 can be made small, and the friction between the abutting portion 271a and the work 2 can be reduced. The abutting portion 271a can also be formed as a separate member detachable from the main body of the upper surface abutting member 271. For example, if the abutting portion 271a wears due to the friction with the upper surface of the work 2, and needs to be replaced, it is possible to replace only the abutting portion 271a rather than the entire upper surface abutting member 271.

The plurality of column members 272 are members that hang the upper surface abutting member 271 to support it. In this embodiment, four column members 272 are provided. By supporting the upper surface abutting member 271 by the plurality of column members 272, it is possible to vertically move the upper surface abutting member 271 while stably maintaining it in a horizontal orientation. Each column member 272 is inserted into a tube member 22d provided in the support plate 22c, and the tube member 22d guides the movement of the column member 272 in the Z direction.

The four column members 272 are arranged at an equal distance from the center of the insertion portion 271b (that is, the shaft center of the rotating tool 25) and at an equal angular pitch θ (90°) in the circumferential direction around the insertion portion 271b (that is, the rotating tool 25), as shown in FIG. 13. This makes it possible to abut the upper surface abutting member 271 against the upper surface of the work 2 more stably.

Note that there are provided the four column members 272 in this embodiment but one to three or five or more column members 272 may be provided. If two or more column members 272 are provided, the column members 272 may be arranged at the equal angular pitch θ in the circumferential direction, similar to the example shown in FIG. 13. If two column members are provided, the angular pitch for arrangement is 180°. If three column members are provided, the angular pitch for arrangement is 120°.

Referring to FIG. 12, the base plate 21 is provided with a driving unit 28 that vertically moves the movable plate 22 with respect to the base plate 21. In this example, the driving unit 28 is an air cylinder with a rod 28a. However, the driving unit 28 may be an electric cylinder, or a unit including an electric motor and a ball screw mechanism or a rack and pinion mechanism.

The rod 28a extends in the Z direction, and the upper end portion of the rod 28a is fixed to a fixing portion 22e of the movable plate 22. When the driving unit 28 is extended/retracted by moving the rod 28a, the movable plate 22 can be vertically moved with respect to the base plate 21. States ST33 and ST34 in FIG. 12 show an example in which the movable plate 22 is moved by extending/retracting the driving unit 28. The state ST34 indicates a state in which the driving unit 28 is extended more than in the state 5133, and the movable plate 22 is raised. When cutting the lower edge of the work 2 by the machining portion 253 of the rotating tool 25, it is possible to press the machining portion 253 against the lower edge of the work 2 stably by biasing the movable plate 22 upward by the driving unit 28.

<Plate Thickness Sensor 6>

The plate thickness sensor 6 will be described with reference to FIG. 15. The plate thickness sensor 6 includes a C-shaped main body 61 and a measurement unit 62. To measure the plate thickness, the work 2 is received by the C-shaped gap of the main body 61, and placed on a placement portion 61a. A measurer 62a of the measurement unit 62 is lowered to abut against the upper surface of the work 2. It is possible to measure the plate thickness of the work 2 by the lowering stroke of the measurer 62a. Before measurement, the measurer 62a and the placement portion 61a are brought into contact with each other while there is no work 2, and the contact position (the height of the measurer) is set as a zero point at which the plate thickness is zero.

As a use example of the plate thickness sensor 6 at the time of machining, for example, a master piece (not shown) as the reference of plate thickness measurement is held in advance in a horizontal orientation by the holding apparatus 10, and the plate thickness of the master piece is measured by the plate thickness sensor 6. A measurement result is saved as a reference values in a control apparatus 80 (to be described later). For each work 2 to be machined, the plate thickness of the work 2 is measured by the plate thickness sensor 6, and the control apparatus 80 calculates the difference between the measured plate thickness and the reference value. In accordance with a calculation result, the position of the vertical moving body 27 with respect to the rotating tool 25 is corrected, and the vertical moving unit 26 is controlled. In accordance with the individual difference of the work 2, the edge of the work 2 can be machined more accurately.

Figure 15:
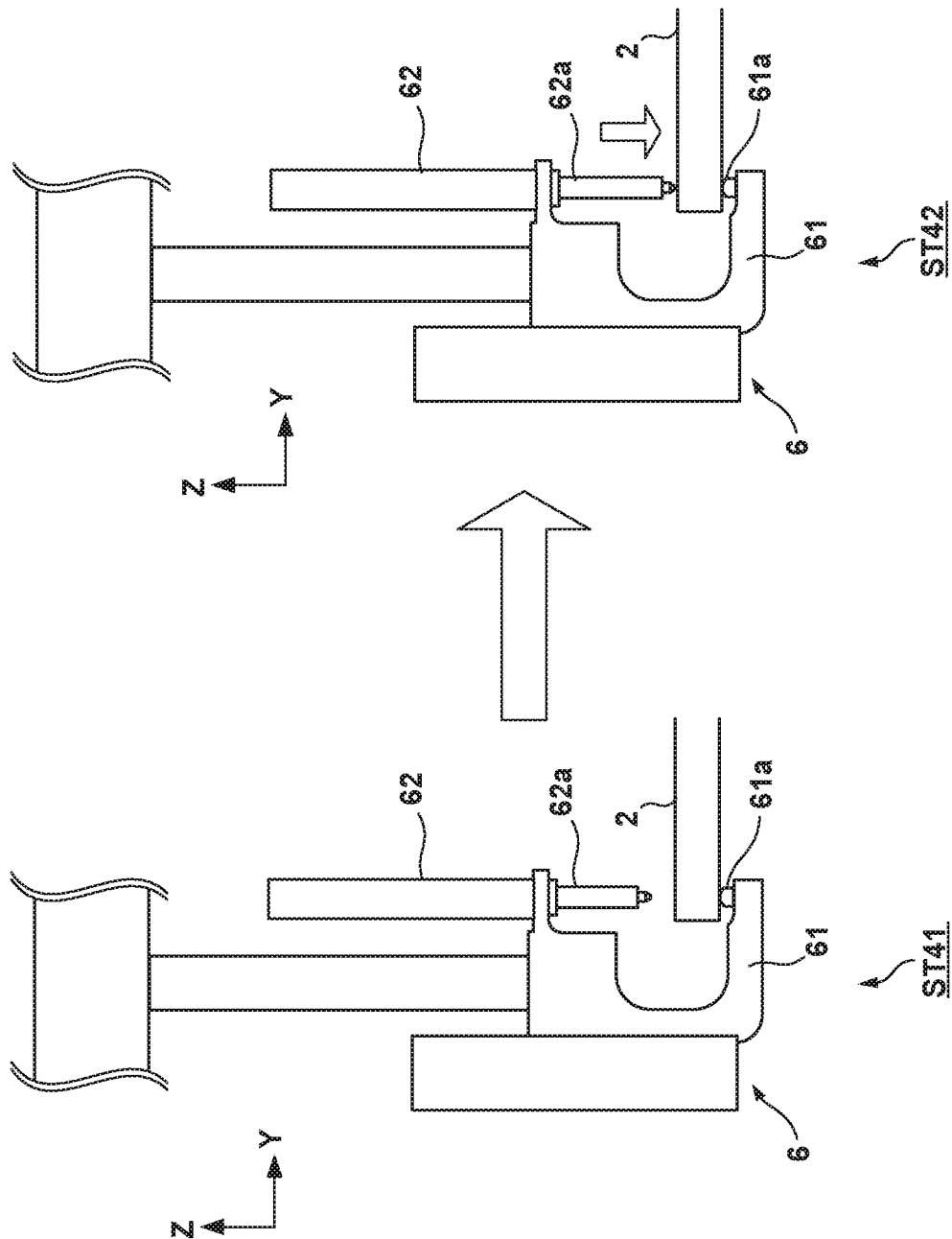
FIG. 15 is an explanatory view of a plate thickness sensor.

Note that as the plate thickness sensor 6, other kinds of sensors such as a laser range finder in addition to the example shown in FIG. 15 are usable.

<Detection Apparatus 40>

Referring to FIGS. 1 to 3, the detection apparatus 40 detects the shape of the machining target portion of the work 2 held by the holding apparatus 10. In this embodiment, the detection apparatus 40 is a shooting apparatus that shoots the shape of the work 2. The detection apparatus 40 includes a support member 41, a camera 42 supported by the support member 41, and an illumination apparatus 43 supported by the support member 41.

The support member 41 is fixed to the beam member 323. That is, the detection apparatus 40 is mounted on the moving body 32 in addition to the machining unit 20. Therefore, the detection apparatus 40 can be moved in the Y direction by the moving apparatus 30. Then, in addition to the machining unit 20, the moving apparatus 30 can also be used as the moving mechanism of the detection apparatus 40, thereby simplifying the system.

The illumination apparatus 43 extends in the X direction, and illuminates a lower portion. The illumination apparatus 43 is formed from, for example, an LED or a laser apparatus. The camera 42 shoots the lower portion. The camera 42 is formed from an image sensor such as a CCD sensor, an optical system, and the like. In this embodiment, a method of shooting the shape of the work 2 by the camera 42 is adopted. However, other methods may be used as long as it is possible to detect the shape of the work 2.

<Conveyance Apparatus 70>

Referring to FIGS. 1 and 2, the conveyance apparatus 70 conveys the work 2 among the holding apparatus 10 and the placement tables 50 and 60. The conveyance apparatus 70 includes a moving body 71, a vertical moving apparatus 72, and a holding apparatus 73 for conveyance. In this embodiment, the conveyance apparatus 70 shares the pair of guide members 31 with the moving apparatus 30. This can simplify the system.

The moving body 71 is laid on the pair of guide members 31, and is guided by the guide members 31 to be movable in the Y direction. The moving body 71 includes a pair of sliders 711, a pair of column members 712, and a beam member 713 laid on the pair of column members 712. The sliders 711 are engaged with the guide members 31 to be movable along the guide members 31. The column members 712 are provided upright on the sliders 711, respectively. The beam member 713 extends in the X direction.

The moving body 71 is moved by a driving mechanism (not shown). As the driving mechanism, various driving mechanisms such as a rack and pinion mechanism, a belt transmission mechanism, and a ball and screw mechanism can be adopted. If the rack and pinion mechanism is adopted, for example, a motor with a pinion may be fixed to one of the pair of sliders 711, and a rack may be provided along the guide member 31. If the rack and pinion mechanism is adopted as the driving mechanism for the moving body 32 of the moving apparatus 30, a rack provided along the guide member 31 may be shared.

The vertical moving apparatus 72 is supported by the moving body 71. In this embodiment, the vertical moving apparatus 72 is fixed to the central portion of the beam member 713 but may be movable in the X direction along the beam member 713. The vertical moving apparatus 72 is an actuator that vertically moves a moving body 72a in the Z direction, and is, for example, an electric cylinder or an air cylinder.

The holding apparatus 73 is fixed to the lower end portion of the moving body 72a. The holding apparatus 73 includes a plurality of chucking bodies 731. When the chucking bodies 731 chuck the surface of the work 2, the holding apparatus 73 holds the work 2. In this embodiment, each chucking body 731 is an electromagnet. However, other kinds of chucking bodies such as a vacuum chuck may be used. The holding apparatus 73 may be a clamp type holding apparatus that grips the work 2.

<Control Apparatus>

Figure 4:
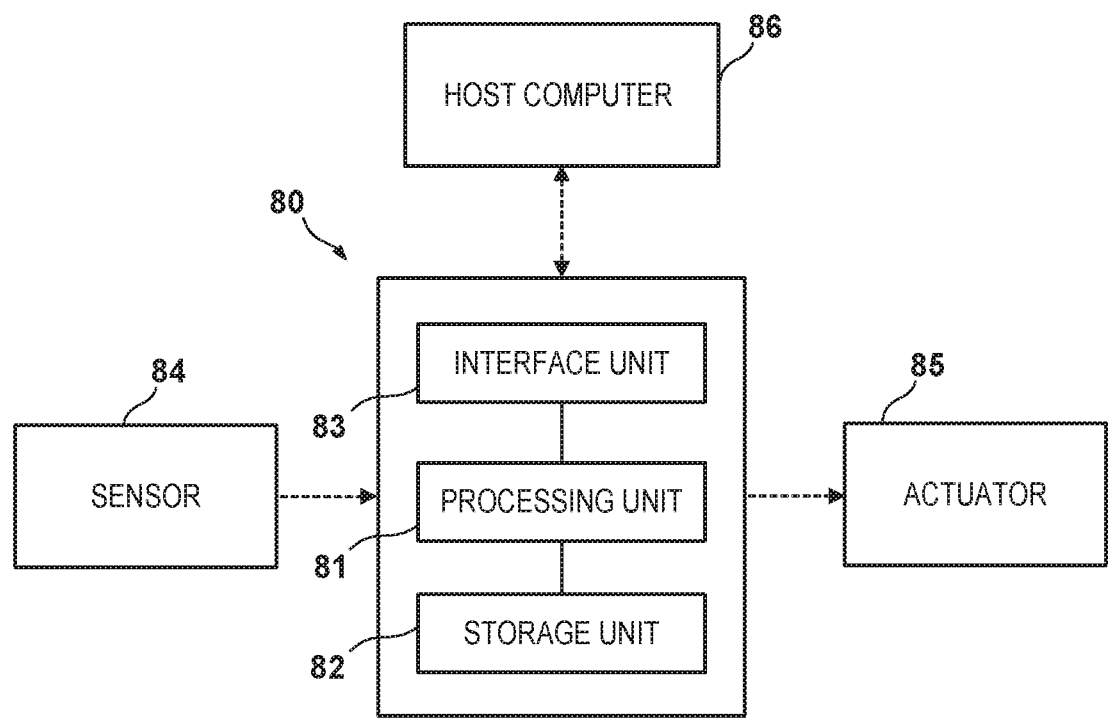
FIG. 4 is a block diagram of a control apparatus.

FIG. 4 is a block diagram of the control apparatus 80 that controls the machining system 1. The control apparatus 80 includes a processing unit 81, a storage unit 82, and an interface unit 83, all of which are interconnected by a bus (not shown). The processing unit 81 executes a program stored in the storage unit 82. The processing unit 81 is, for example, a CPU. The storage unit 82 is, for example a RAM, a ROM, a hard disk, or the like. The interface unit 83 is provided between the processing unit 81 and external devices (a host computer 86, a sensor 84, and an actuator 85), and is, for example, a communication interface or an I/O interface.

The sensor 84 includes, for example, a sensor that detects the position of the machining unit 20 (for example, a sensor that detects the position of each of the moving bodies 32, 33, and 34), a sensor that detects the position of the holding apparatus 73, the image sensor of the camera 42, and the plate thickness sensor 6. The actuator 85 includes the chucking bodies 113, the driving sources of the moving mechanisms 12, the respective driving sources provided in the moving apparatus 30, the respective driving sources of the machining unit 20, the driving source of the conveyance apparatus 70, and the chucking bodies 731.

The control apparatus 80 controls the machining system 1 in accordance with an instruction of the host computer 86. A control example will be described below.

<Conveyance of Work>

An example of conveyance of the work 2 will be described with reference to FIGS. 5 and 6. Generally, a plurality of unmachined works 2 are loaded onto the placement table 60 by a conveyance apparatus (not shown). The conveyance apparatus 70 conveys the works 2 on the placement table 60 onto the holding apparatus 10 one by one. When machining of the work 2 on the holding apparatus 10 ends, the conveyance apparatus 70 conveys the machined work 2 onto the placement table 50. The machined work 2 is stacked on the placement table 50. If the number of machined works 2 on the placement table 50 reaches a predetermined number, a conveyance apparatus (not shown) unloads the machined works 2 from the placement table 50 to the outside.

Figure 5:
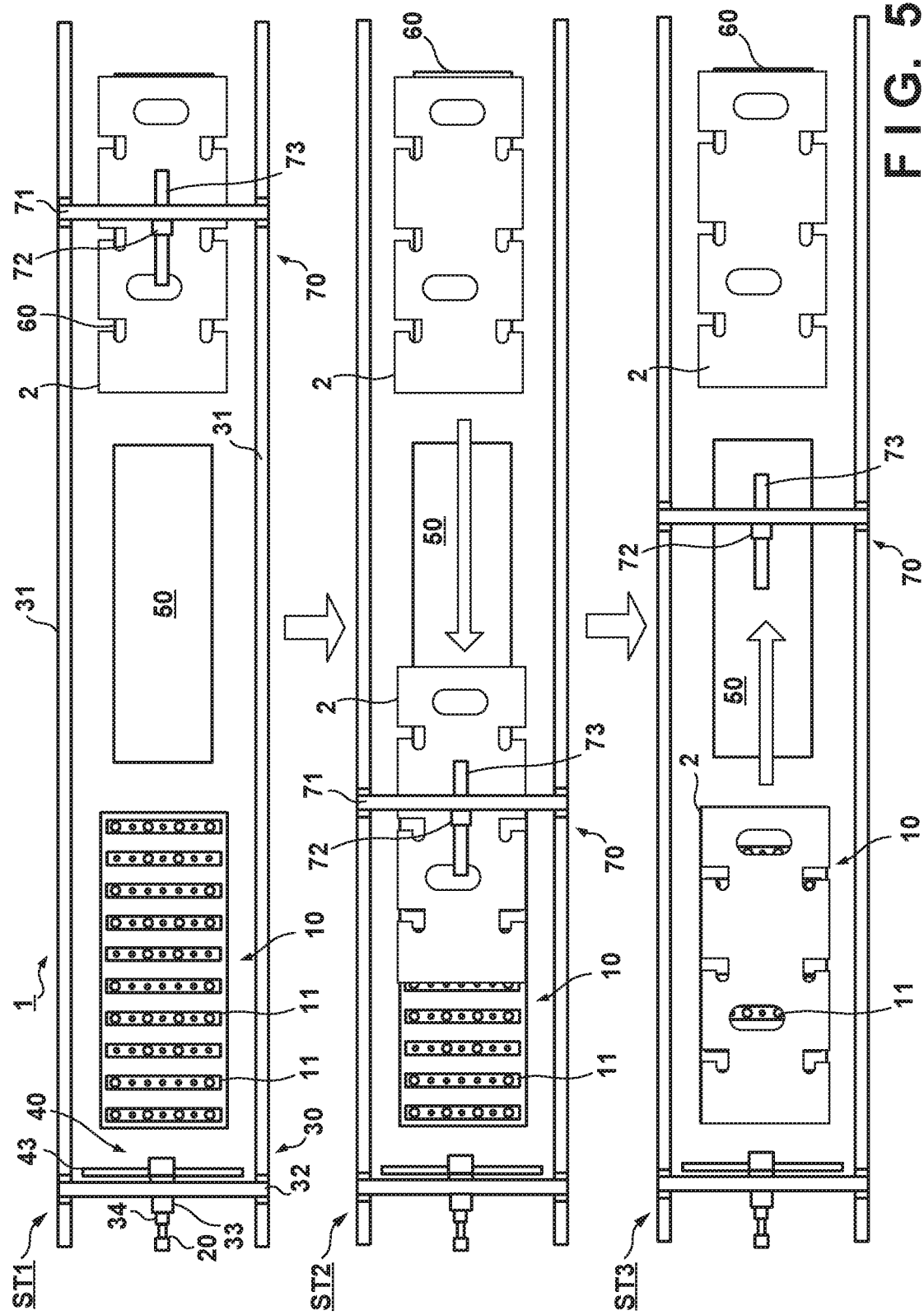
FIG. 5 is an explanatory view of the operation of the machining system shown in FIG. 1.

A state ST1 in FIG. 5 indicates a state in which the holding apparatus 73 of the conveyance apparatus 70 holds the work 2 on the placement table 60. The vertical moving apparatus 72 lowers the holding apparatus 73 onto the surface of the uppermost work 2 among the stacked works 2. Then, the chucking bodies 731 are actuated to hold the work 2. Subsequently, the vertical moving apparatus 72 raises the holding apparatus 73 to lift up the work 2.

Next, as shown in a state ST2 in FIG. 5, the moving body 71 is moved to the holding apparatus 10. Thus, the work 2 is located above the holding apparatus 10. The vertical moving apparatus 72 lowers the holding apparatus 73 to place the work 2 on the holding apparatus 10. Then, chucking by the chucking bodies 731 is stopped to release the held work 2, and the vertical moving apparatus 72 raises the holding apparatus 73.

Next, as shown in a state ST3 in FIG. 5, the moving body 71 is moved toward the placement table 60. With the above operation, conveyance of one work 2 from the placement table 60 to the holding apparatus 10 ends. The conveyed work 2 is held on the holding apparatus 10, and machined.

When machining ends, the work 2 held by the holding apparatus 10 is released, and the conveyance apparatus 70 conveys the work 2 on the holding apparatus 10 to the placement table 50. First, the moving body 71 is moved to the holding apparatus 10 to locate the holding apparatus 73 above the holding apparatus 10. This locates the holding apparatus 73 above the work 2. The vertical moving apparatus 72 lowers the holding apparatus 73, and the chucking bodies 731 are actuated to hold the work 2. Subsequently, the vertical moving apparatus 72 raises the holding apparatus 73 to lift up the work 2.

Figure 6:
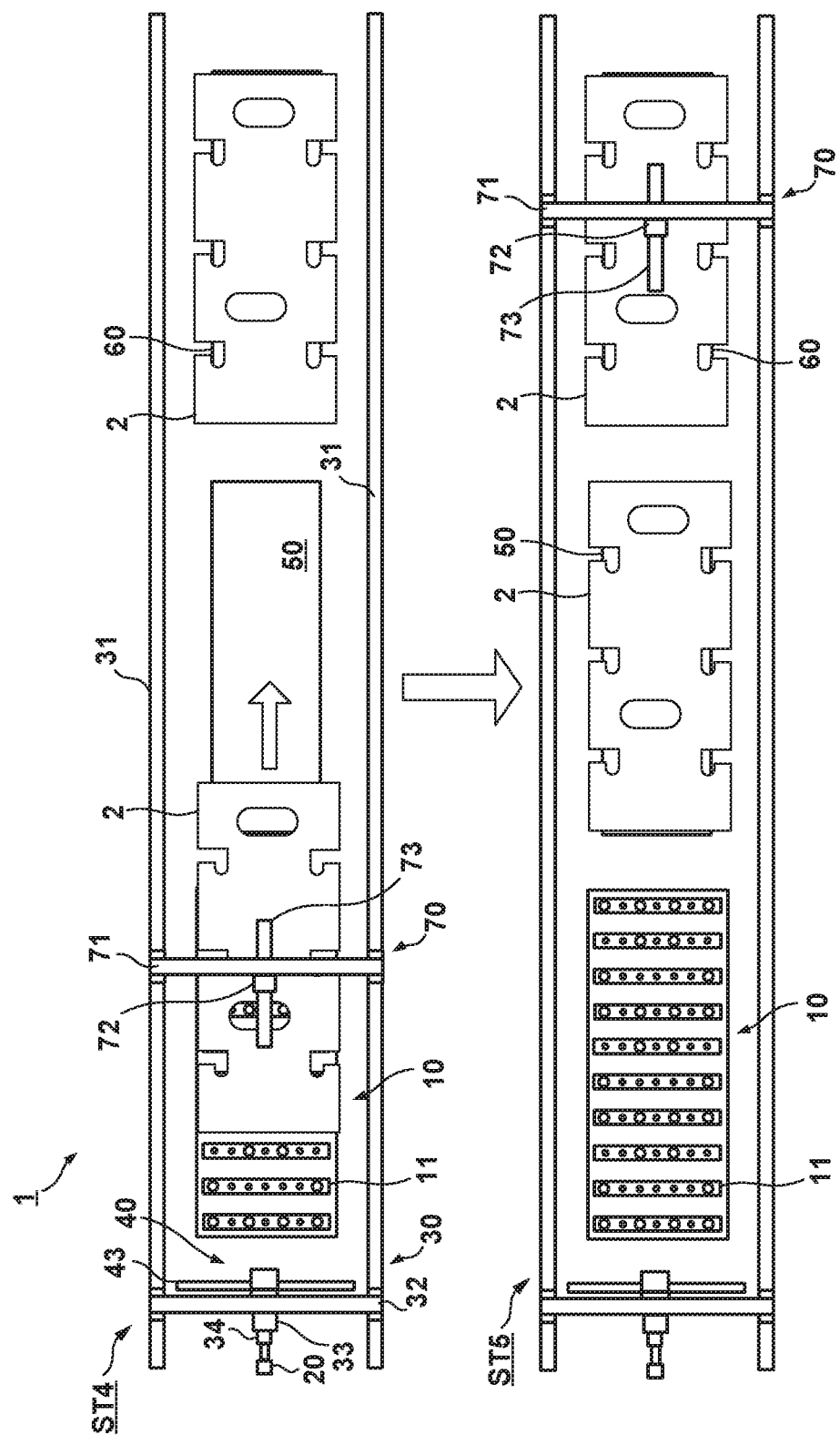
FIG. 6 is an explanatory view of the operation of the machining system shown in FIG. 1.

Next, as shown in a state ST4 in FIG. 6, the moving body 71 is moved to the placement table 50. This locates the work 2 above the placement table 50. The vertical moving apparatus 72 lowers the holding apparatus 73 to place the work 2 on the placement table 50 (or on the work 2 placed on the placement table 50). Then, chucking by the chucking bodies 731 is stopped to release the held work 2.

After that, as shown in a state ST5 in FIG. 6, the moving body 71 is moved above the placement table 60 to convey the next work 2 to the holding apparatus 10.

<Machining of Work>

An example of machining of the work 2 conveyed onto the holding apparatus 10 will be described next. Generally, the shape and position of the machining target portion of the work 2 are detected. Then, based on a detection result, the moving mechanism 12, the moving apparatus 30, and the machining unit 20 are controlled to machine the work 2.

In this embodiment, these processes are performed by one reciprocating movement operation of the moving body 32. More specifically, the shape of the work 2 is detected during forward movement of the moving body 32, and the work 2 is machined during the backward movement of the moving body 32.

<Detection of Shape>

Figure 7:
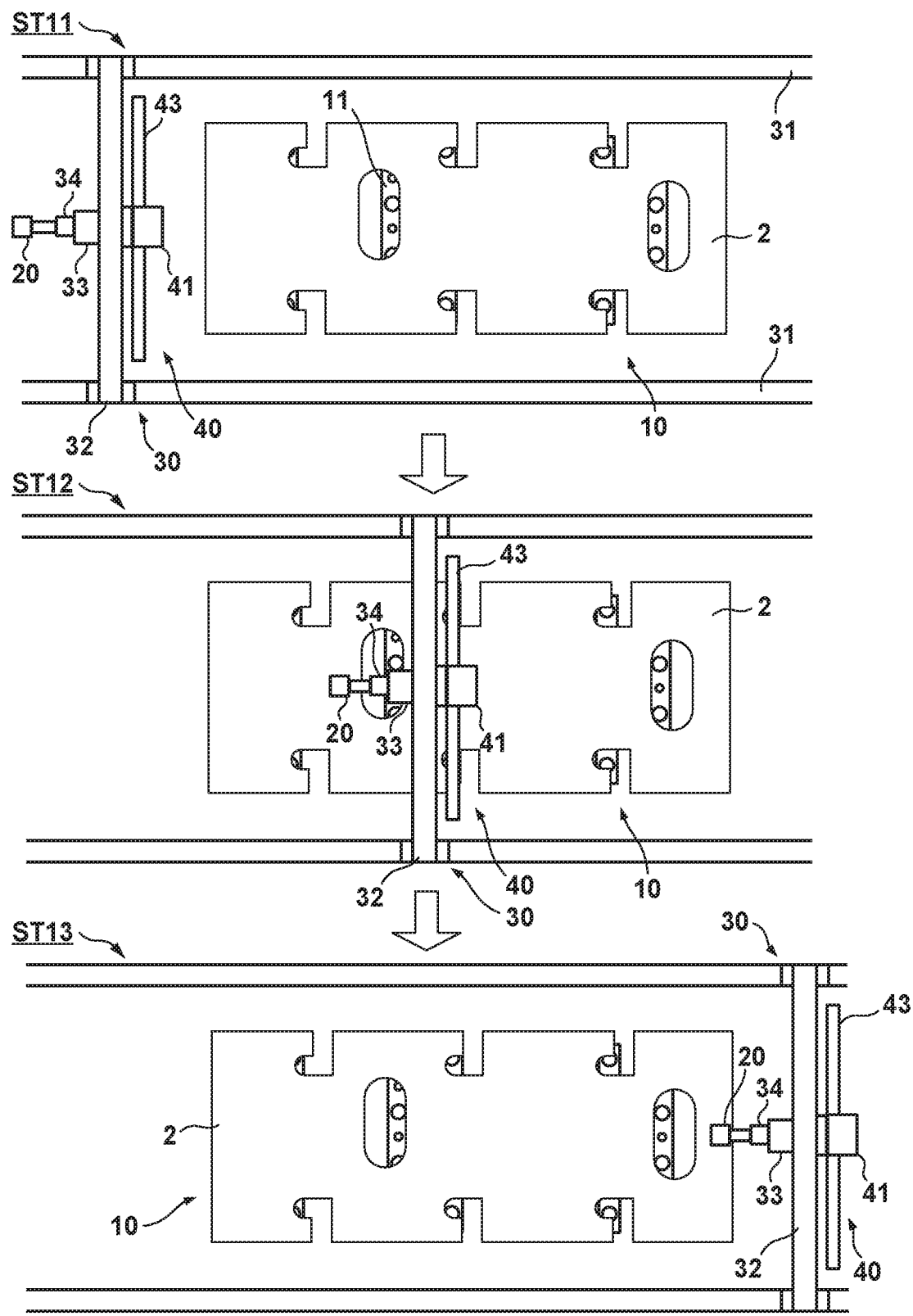
FIG. 7 is an explanatory view of the operation of the machining system shown in FIG. 1.
Figure 8:
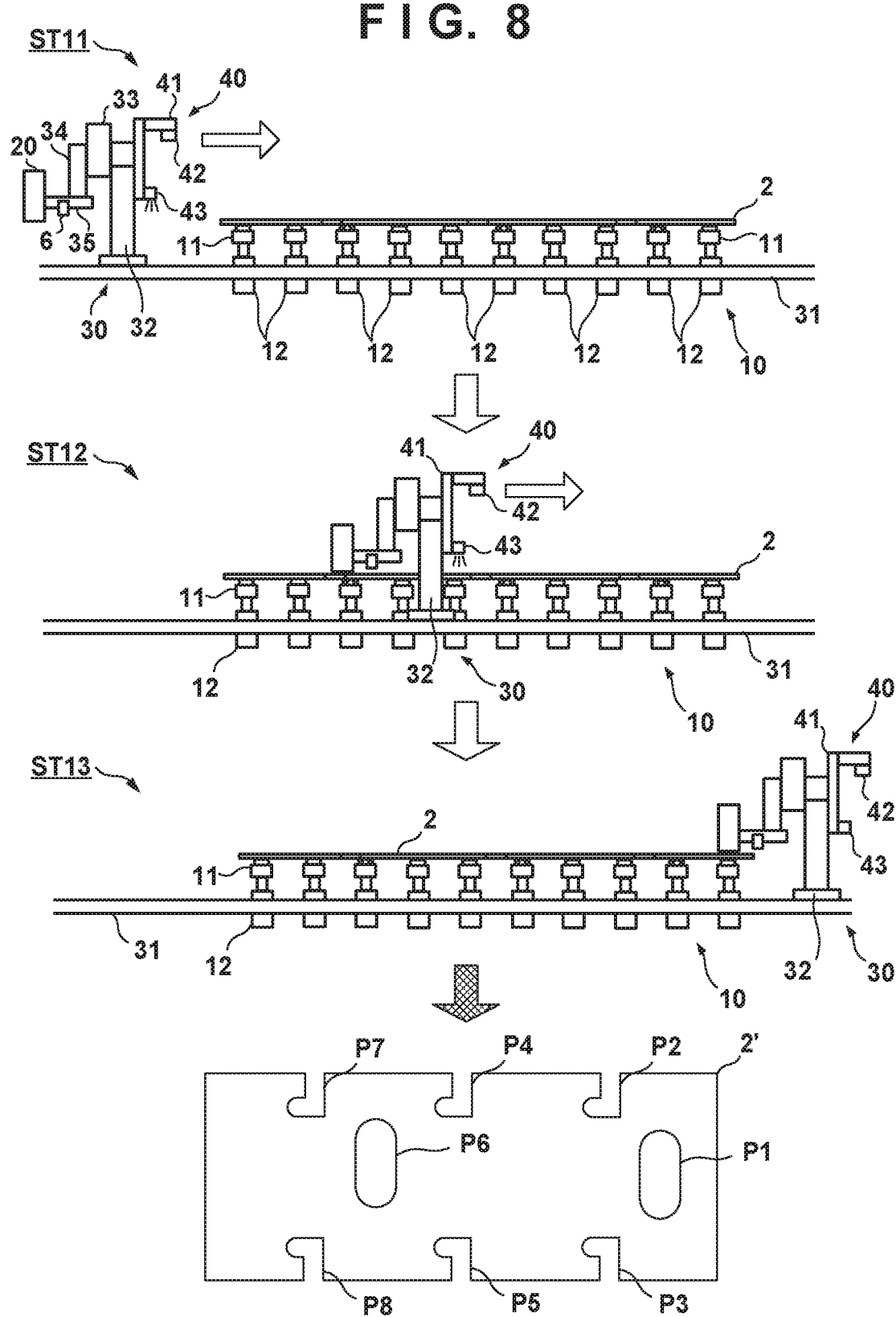
FIG. 8 is an explanatory view of the operation of the machining system shown in FIG. 1.

An example of detection of the shape of the work 2 will be described with reference to FIGS. 7 and 8. FIGS. 7 and 8 show the states (ST11 to ST13) of the machining area 3 in a planar view (FIG. 7) and a side view (FIG. 8), respectively.

The state ST11 shows a case in which the moving body 32 is at the initial position. The camera 42 is located at a position shifted in the Y direction from the work 2 held by the holding apparatus 10. Detection of the shape of the work 2 starts from this position. First, the illumination apparatus 43 starts to irradiate the work 2, and the camera 42 starts to shoot the work 2.

Next, as shown in the state ST12, the moving body 32 is moved to scan on the work 2. The camera 42 sequentially shoots the shape of the work 2, and image data and position information are saved in the storage unit 82. When, as shown in the state ST13, the moving body 32 reaches the position (turnaround position) shifted in the Y direction from the work 2, shooting ends, in this way, the work 2 is wholly scanned.

Note that in this embodiment, the detection apparatus 40 is fixed to the beam member 323. However, the detection apparatus 40 may be attached to the beam member 323 via a vertical moving apparatus to be movable vertically. Then, a sensor that detects the distance between the detection apparatus 40 and the work 2 may be provided, and the vertical moving apparatus may be controlled to keep the distance constant during scanning of the work 2. This control processing can reliably maintain a state in which the camera 42 focuses on the work 2 during scanning of the work 2.

As a result of the shooting processing, for example, shape data 2' of the work 2 shown in FIG. 8 is obtained. This shape data 2' indicates the outer shape of the work 2 and its position information (coordinate data). In the example of FIG. 8, a plurality of machining target portions P1 to P8 exist in the work 2. The shape data 2' also includes the outer shapes of the machining target portions P1 to P8 and their pieces of position information.

Note that in the example of FIG. 8, a case in which the plurality of machining target portions exist in one work 2 is exemplified. However, one work 2 may include one machining target portion. In addition, a machining target portion may be automatically determined or designated by an operator.

If a machining target portion is automatically determined, design data of the work 2 in which a machining target portion is designated is prepared, and the design data and the shape data 2' are compared with each other, thereby making it possible to automatically determine a machining target portion. If the overall peripheral edge of the work 2 is set as a machining target portion, it is only necessary to recognize the peripheral edge, and thus automatic determination can be made without requiring preparation of design data.

If a machining target portion is designated by the operator, for example, the shape data 2' is transmitted to the host computer 86 to display an image, and then the operator of the host computer 86 can designate a machining target portion from an input device.

Note that the acquired coordinates of the shape data 2' can be recognized by, for example, collating planar data acquired in advance and representing the layout of the holding apparatus 10 with the output signal of the encoder of the motor that drives the moving body 32.

<Details of Machining of Work>

Figure 9:
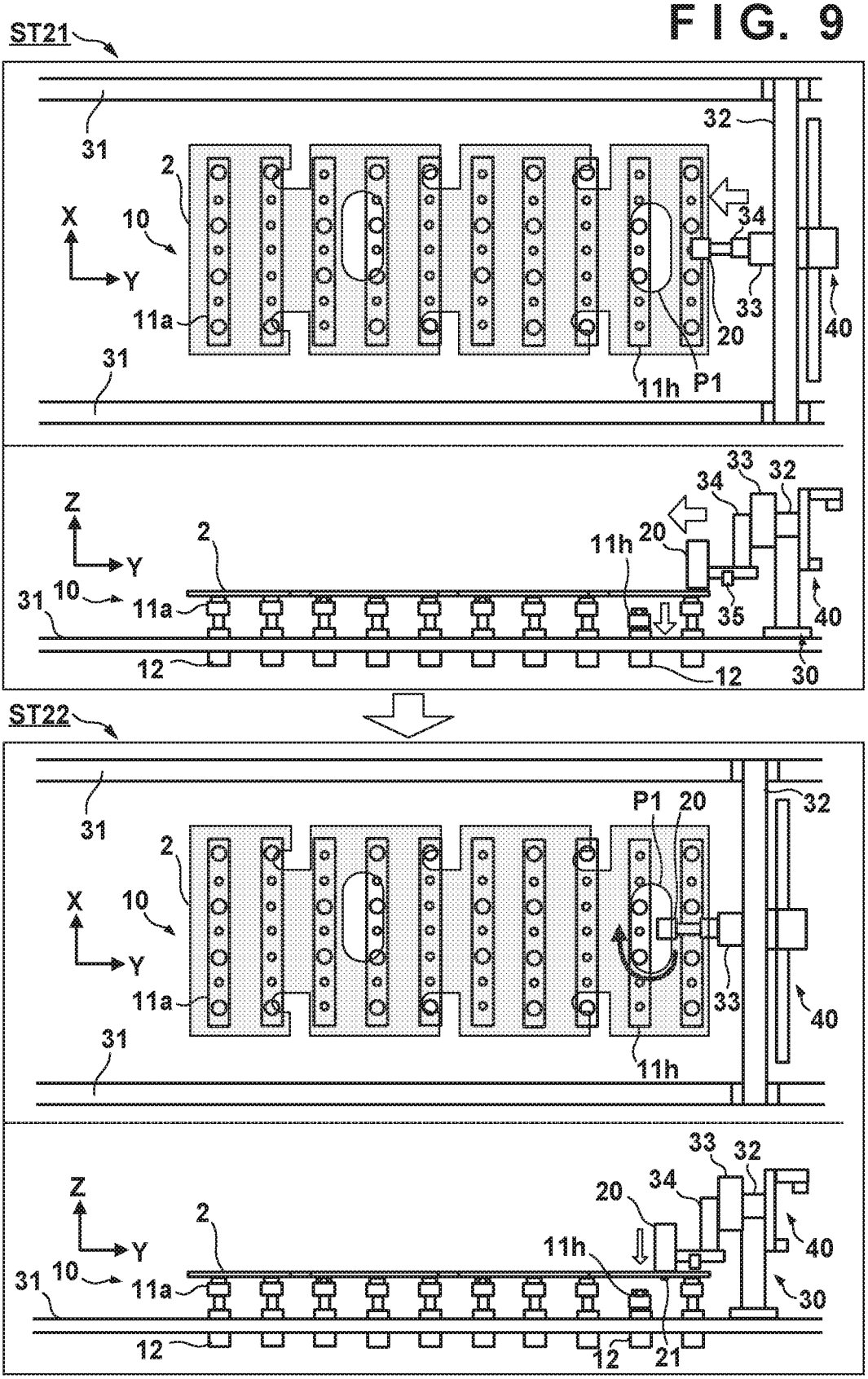
FIG. 9 is an explanatory view of the operation of the machining system shown in FIG. 1.
Figure 10:
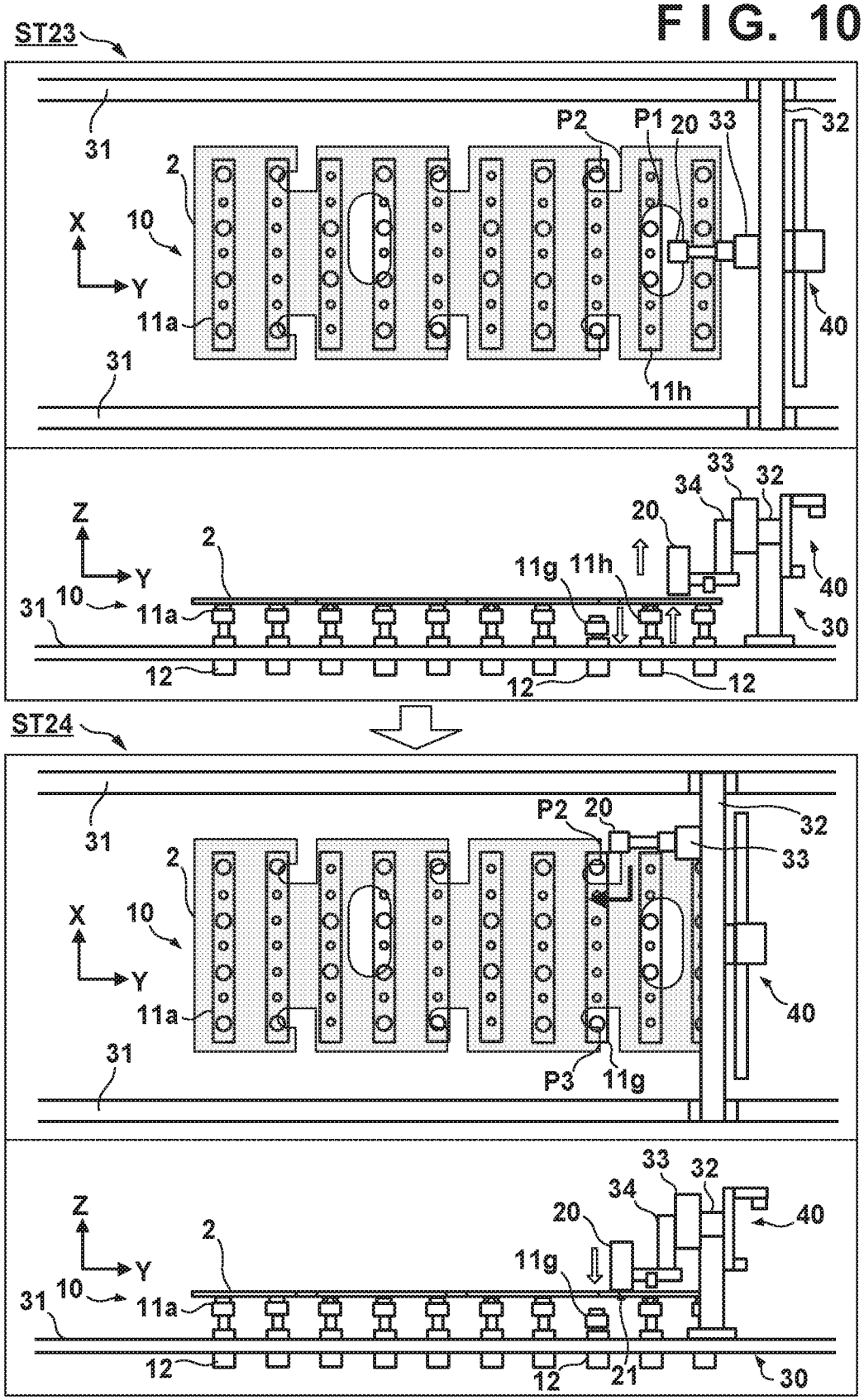
FIG. 10 is an explanatory view of the operation of the machining system shown in FIG. 1.

An example of machining based on the detection result of the shape of the work 2 will be described with reference to FIGS. 9 and 10. FIGS. 9 and 10 show the states (ST21 to ST24) of the machining area 3 in a planar view and a side view in upper and lower portions. Furthermore, the work 2 on the holding apparatus 10 is transparently shown.

The state ST21 in FIG. 9 indicates a case in which the moving body 32 is located in the end portion of the work 2. This embodiment assumes that the machining target portions are machined in an order of P1→P2→ . . . →P8. First, the moving apparatus 30 moves the machining unit 20 closer to the machining target portion P1 (movement step). At the same time, based on the shape data 2', the holding unit 11 located at the machining target portion P1 is specified. The holding unit 11*h* is located at the machining target portion P1. Therefore, chucking by the chucking bodies 113 of the holding unit 11*h* is stopped to release holding. The moving mechanism 12 that moves the holding unit 11*h* is driven to switch the position of the holding unit 11*h* from the holding position to the retracted position (position change step). Note that movement of the machining unit 20 and switching of the position of the holding unit 11 may be controlled to be perform sequentially instead of being performed simultaneously. In this case, either of these processes may be performed first.

As shown in the state ST22 in FIG. 9, when the machining unit 20 reaches a position above the machining target portion P1, the machining unit 20 is lowered and the machining unit 20 is driven, starting chamfering of the edge of the machining target portion P1 by the rotating tool 25. Details of chamfering will be described later with reference to FIGS. 16 to 18.

By moving the machining unit 20 in the direction of an arrow along the shape of the machining target portion P1, chamfering of the edge of the machining target portion P1 is continuously performed. Since chamfering of the edge is performed for each of the upper and lower edges of the work 2, the machining unit 20 moves in the direction of the arrow along the shape of the machining target portion P1 twice. However, to machine the upper and lower edges of the work 2, the work 2 need not be flipped. The machining unit 20 can be moved by the moving apparatus 30 based on the shape data 2'.

At the time of chamfering, the holding unit 11*h* is at the retracted position, and never interferes with the rotating tool 25. In other words, by moving the holding unit 11*h* to the retracted position, the portion of the holding unit 11*h* in the holding apparatus 10 functions as not a table used to place and support the work 2 but a work area (work space) of the machining target portion P1 of the work 2. Therefore, the holding unit 11*h* never hinders machining or is never damaged by the rotating tool 25. Furthermore, the holding units 11 other than the holding unit 11*h* are located at the holding positions to hold the work 2. Thus, the position of the work 2 is never shifted during machining.

When machining of the machining target portion P1 ends, the process advances to machining of the machining target portion P2. The state ST23 in FIG. 10 indicates a state in which transition to machining of the machining target portion P2 starts. First, the machining unit 20 is raised, and is moved closer to the machining target portion P2 by the moving apparatus 30. At the same time, based on the shape data 2', the holding unit 11 located at the machining target portion P2 is specified. The holding unit 11*g* is located at the machining target portion P2. Therefore, chucking by the chucking bodies 113 of the holding unit 11*g* is stopped to release holding. The moving mechanism 12 that moves the holding unit 11*g* is driven to switch the position of the holding unit 11*g* from the holding position to the retracted position (position change step). Furthermore, the holding unit 11*h* located at the already machined machining target portion P1 is switched from the retracted position to the holding position. Then, the chucking bodies 113 of the holding unit 11*h* are driven to hold the work 2.

As shown in the state ST24 in FIG. 10, when the machining unit 20 reaches a position above the machining target portion P2, the machining unit 20 is lowered and the machining unit 20 is driven, starting machining of the machining target portion P2 by the rotating tool 25. By moving the machining unit 20 in the direction of an arrow along the shape of the machining target portion P2, chamfering of the edge of the machining target portion P2 is performed. The machining unit 20 can be moved by the moving apparatus 30 based on the shape data 2'.

Similar to the machining target portion P1, the holding unit 11*g* is located at the retracted position, and never interferes with the rotating tool 25. Therefore, the holding unit 11*g* never hinders machining or is never damaged by the rotating tool 25. Furthermore, the holding units 11 other than the holding unit 11*g* are located at the holding positions to hold the work 2. Thus, the position of the work 2 is never shifted during machining.

When machining of the machining target portion P2 ends, the process advances to machining of the machining target portion P3. The common holding unit 11 (holding unit 11*g*) is located at the machining target portions P2 and P3. Thus, the machining target portion P3 is machined while keeping the holding unit 11*g* at the retracted position. The machining operation advances in the same procedure.

As described above, according to this embodiment, when the holding unit 11 located at the machining target portion is moved to the retracted position, and the remaining holding units 11 hold the work 2, it is possible to avoid interference between the rotating tool 25 and the holding unit 11 while reliably holding the work 2. By making each holding unit 11 movable between the retracted position and the holding position, different machining target portions can be processed. Therefore, one holding apparatus 10 can quickly process various works having different shapes and different machining target portions.

When machining of all the machining target portions ends, the moving body 32 returns to the initial position. In this way, during one reciprocating movement operation of the moving body 32, the shape of the work 2 can be detected and the work 2 can be machined. After that, the conveyance apparatus 70 conveys the machined work 2 from the holding apparatus 10, and conveys the new unmachined work 2 to the holding apparatus 10. For the new unmachined work 2, detection of the shape of the work 2 and machining of the work 2 are performed in the same procedure.

This embodiment has explained a case in which for each work 2, detection of the shape of the work 2 and machining of the work 2 are performed. However, when machining the same kind of works 2 successively, the shape may be detected only once in the first operation. In this case, a positioning apparatus that positions the work 2 on the holding apparatus 10 is provided so that the second and subsequent works 2 are held at the same position as that of the first work 2. Furthermore, the work 2 can be machined while detecting the shape of the work 2. For example, during the movement of the moving body 32 from the initial position to the turnaround position, the work 2 can be machined based on the result of detecting the shape of the work 2 while detecting the shape of the work <Details of Chamfering>

Figure 16:
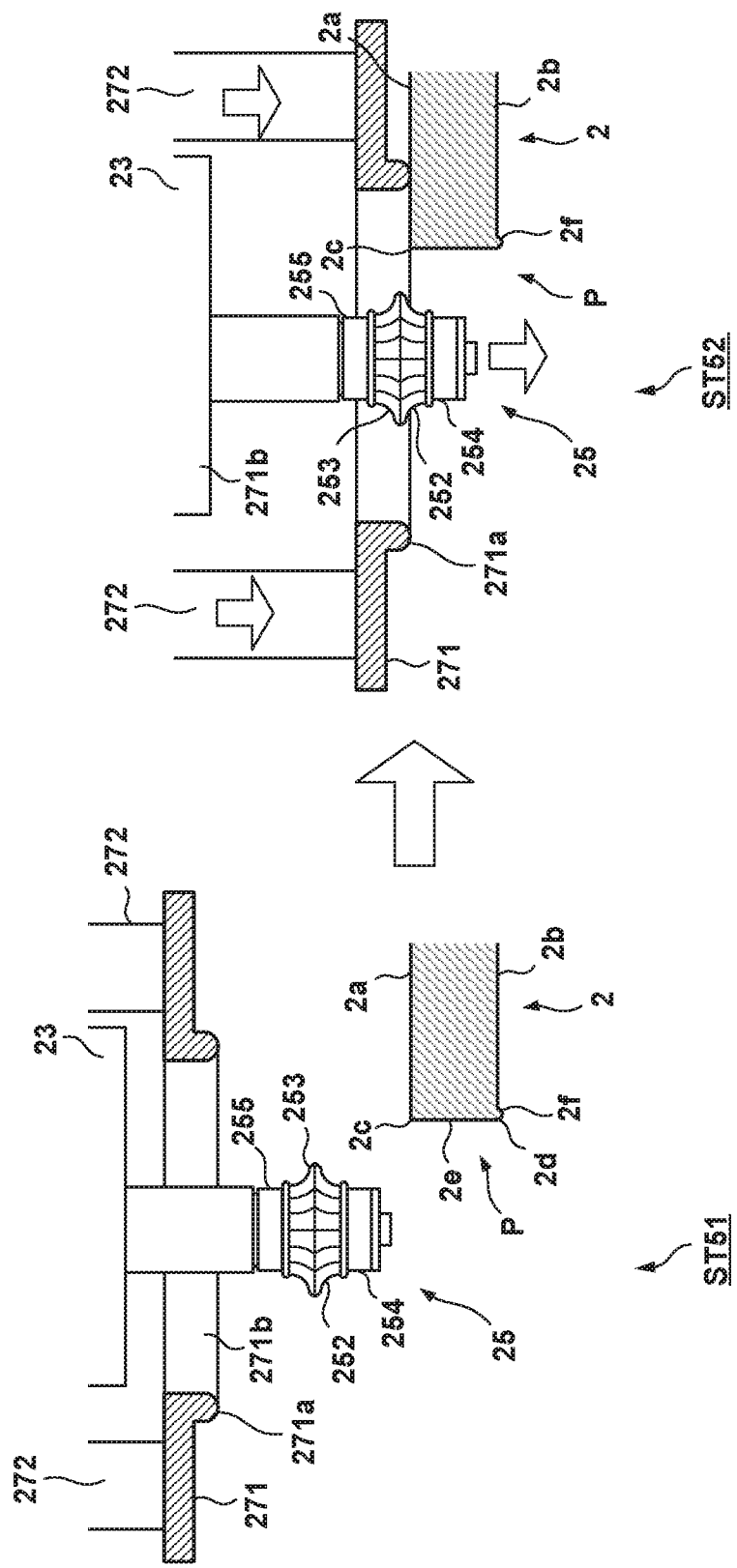
FIG. 16 is an explanatory view of the operation of the machining unit.

Details of chamfering will be described with reference to FIGS. 16 to 18. A state ST51 in FIG. 16 indicates a state in which the machining unit 20 is located above the machining target portion P this time. Each view shows the rotating tool 25 as if it stopped but the rotating tool 25 is rotating.

The work 2 includes the upper surface 2a, the lower surface 2b, and the end face 2e. The corner portion between the upper surface 2a and the end face 2e forms an upper edge 2c, and the corner portion between the lower surface 2b and the end face 2e forms a lower edge 2d. If the shape of the work 2 is formed by cutting a raw material steel sheet by a laser cutter or a plasma cutter, molten slag 2f adheres to a portion around the cut edge on the lower side of the steel sheet. The surface has an uneven structure in the state in which the slag 2f adheres to the portion around the cut edge, and if the work is directly used for an end product, the end product is adversely influenced. It is, therefore, necessary to perform chamfering (for example, R chamfering or C chamfering) of the cut edge by including removal of the slag 2f. In this embodiment, the work 2 is held by setting, as the lower surface 2b, the surface on which the slag 2f has been generated. The plate thickness of the work 2 is measured by the plate thickness sensor 6 before machining.

In this embodiment, chamfering of the work 2 is performed in an order of the upper edge 2c→the lower edge 2d. A state ST52 in FIG. 16 indicates a state in which the moving apparatus 30 lowers the machining unit 20 to locate the machining portion 252 of the rotating tool 25 on a side of the upper edge 2c. At this time, the vertical moving unit 26 changes the position of the upper surface abutting member 271 in the Z direction with respect to the rotating tool 25 so that the abutting portion 271a of the upper surface abutting member 271 abuts against the upper surface 2a. In the state ST52, the position of the machining unit 20 (the position of the machining portion 252) and the position of the vertical moving body 27 (upper surface abutting member 271) are set based on the result of previously measuring the plate thickness of the work 2 by the plate thickness sensor 6. For example, the optimum positions of the machining unit 20 (machining portion 252) and the vertical moving body 27 in the master piece can be corrected based on the plate thickness measurement result of the work 2 to set the respective positions this time.

Figure 17:
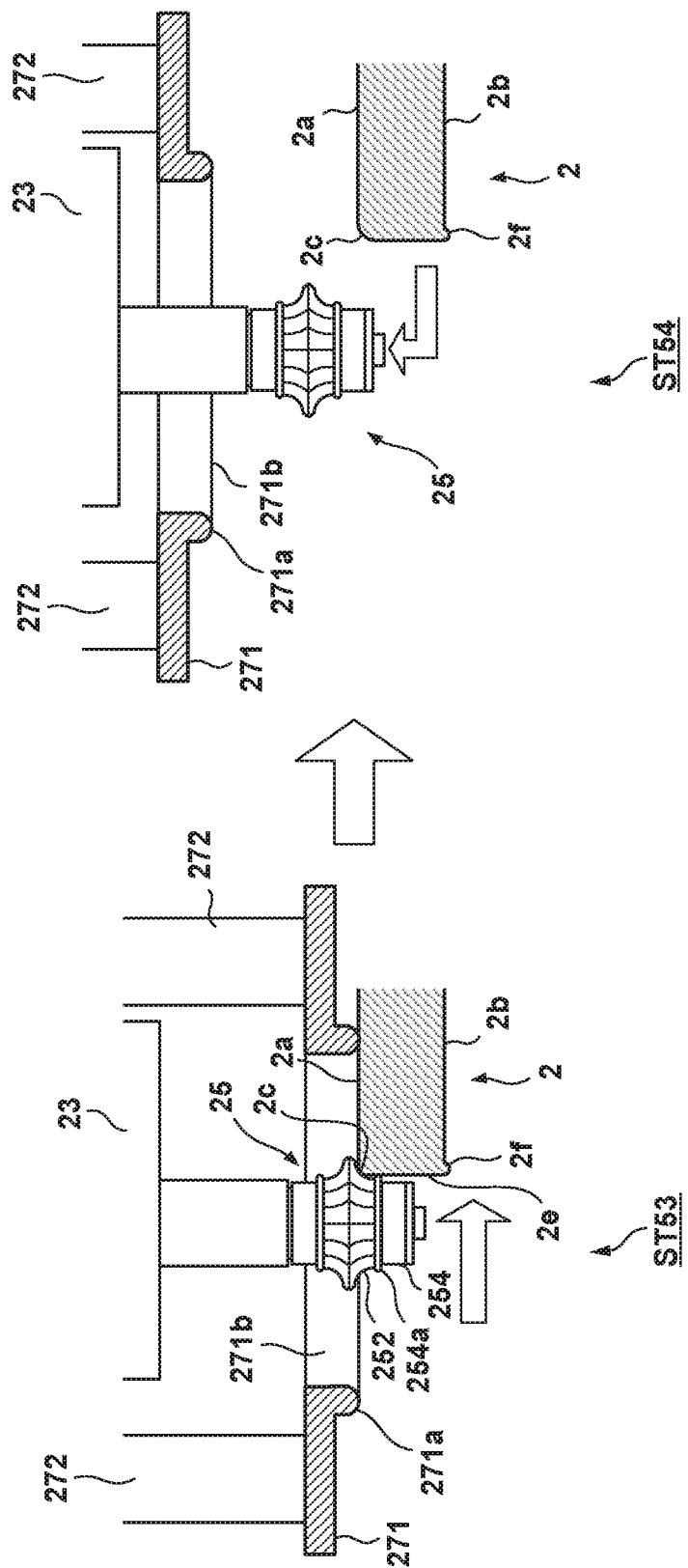
FIG. 17 is an explanatory view of the operation of the machining unit.

As shown in a state ST53 in FIG. 17, the moving apparatus 30 horizontally moves the machining unit 20, starting chamfering of the upper edge 2c by the machining portion 252 (machining step). At this time, when the abutting portion 254a of the end face abutting member 254 abuts against the end face 2e, it is possible to suppress the cutting depth from being deep while pressing the machining portion 252 against the upper edge 2c by the moving apparatus 30. When chamfering starts, the moving apparatus 30 moves the machining unit 20 along the shape of the machining target portion P, as shown in the state ST22 in FIG. 9 and the like (first moving operation). At this time, the abutting portion 271a of the upper surface abutting member 271 is abutted against the upper surface 2a of the work 2. However, the size or diameter of the upper surface abutting member 271 is adjusted so that the abutting position is far away from the upper edge 2c. This can abut the upper surface abutting member 271 against the upper surface 2a of the work 2 stably without any influence of the slag 2f even if the slag 2f adheres to a portion near the upper edge 2c. Furthermore, a state in which the abutting portion 254a of the end face abutting member 254 abuts against the end face 2e of the work 2 is maintained. Thus, the cutting portion can be continuously moved while maintaining the position of the machining portion 252 with respect to the upper edge 2c at an appropriate position.

When chamfering of the upper edge 2c ends, the process transitions to chamfering of the lower edge 2d. First, as shown in a state ST54 in FIG. 17, the moving apparatus 30 horizontally moves the machining unit 20 to separate the machining portion 252 from the upper edge 2c, and then raises the machining unit 20. Subsequently, as shown in a state ST55 in FIG. 18, the moving apparatus 30 lowers the machining unit 20 to locate the machining portion 253 of the rotating tool 25 on a side of the lower edge 2d. At this time, the vertical moving unit 26 changes the position of the upper surface abutting member 271 in the Z direction with respect to the rotating tool 25 so that the abutting portion 271a of the upper surface abutting member 271 abuts against the upper surface 2a (change step). Similar to machining of the upper edge 2c, the position of the machining unit 20 (the position of the machining portion 253) and the position of the vertical moving body 27 (the position of the upper surface abutting member 271) are set based on the result of measuring the plate thickness of the work 2 by the plate thickness sensor 6.

Figure 18:
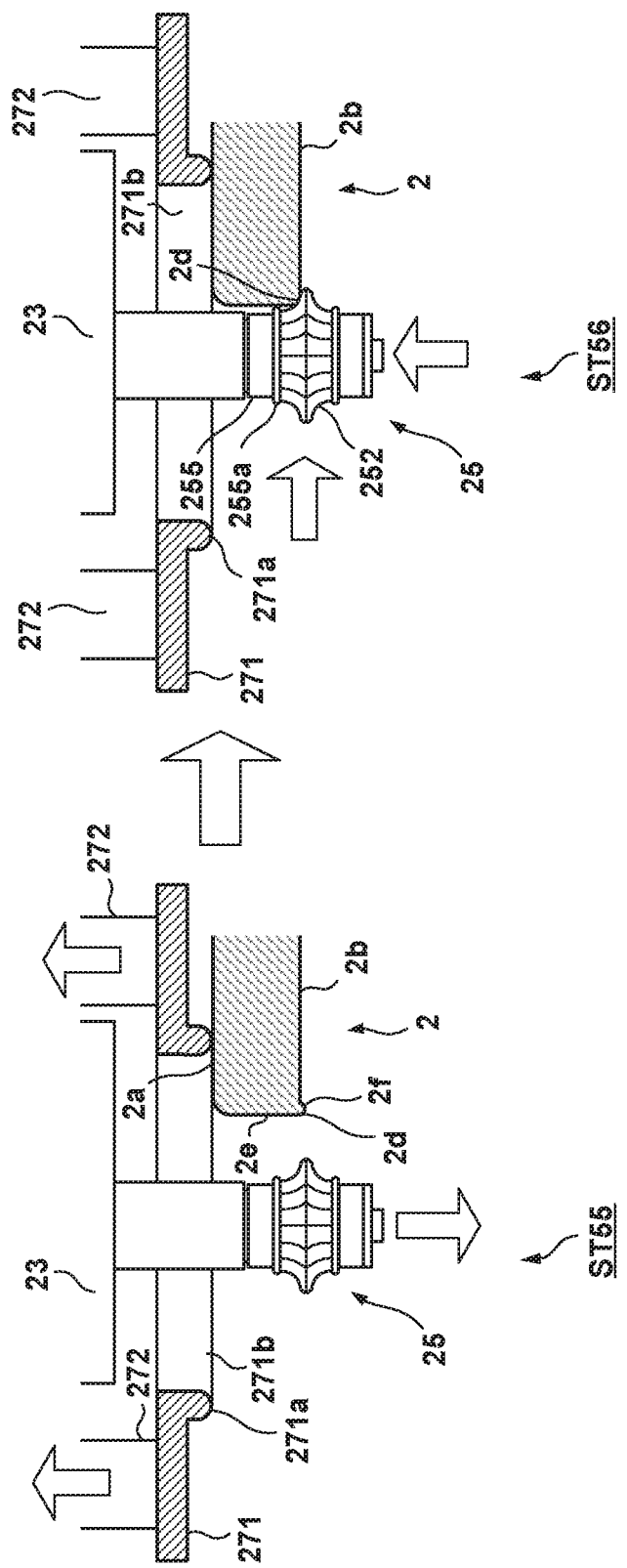
FIG. 18 is an explanatory view of the operation of the machining unit.

As shown in a state ST56 in FIG. 18, the moving apparatus 30 horizontally moves the machining unit 20, starting chamfering of the lower edge 2d by the machining portion 253 (machining step). At this time, when the abutting portion 255a of the end face abutting member 255 abuts against the end face 2e, it is possible to suppress the cutting depth from being deep while pressing the machining portion 253 against the lower edge 2d by the moving apparatus 30.

Figure 19A:
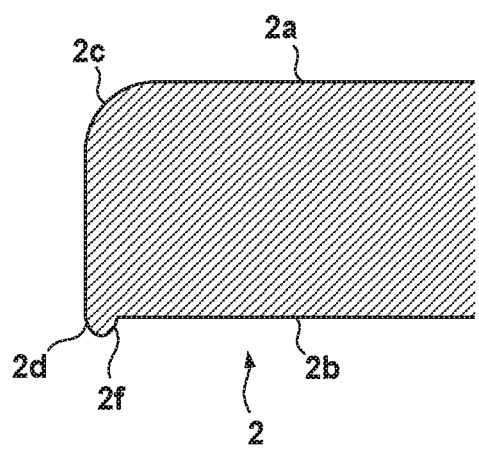
FIGS. 19A and 19B are schematic views respectively showing sectional shapes before and after chamfering of the lower edge of a work.
Figure 19B:
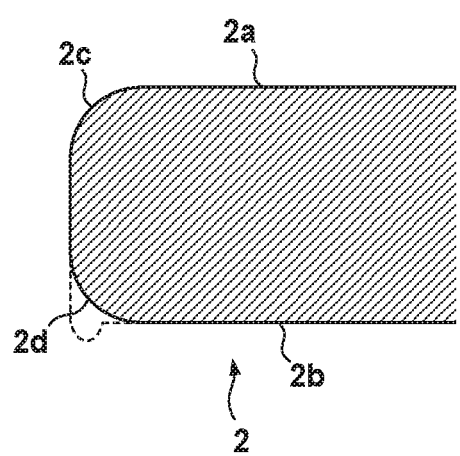

When chamfering starts, the moving apparatus 30 moves the machining unit 20 along the shape of the machining target portion P, as shown in the state ST22 in FIG. 9 and the like (second moving operation). At this time, a state in which the abutting portion 271a of the upper surface abutting member 271 abuts against the upper surface 2a of the work 2 and the abutting portion 255a of the end face abutting member 255 abuts against the end face 2e of the work 2 is maintained. Thus, the cutting portion can be continuously moved while maintaining the position of the machining portion 253 with respect to the lower edge 2d at an appropriate position. Since the upper surface abutting member 271 abuts against the upper surface 2a of the work 2 without any slag 2f, the slag 2f never adversely influences positioning at the time of chamfering of the lower edge 2d. In addition, as shown in schematic views before and after chamfering of the lower edge 2d in FIGS. 19A and 19B, the slag 2f is removed by chamfering of the lower edge 2d of the work 2, and if the work 2 having undergone chamfering in the machining system 1 according to this embodiment is used for a product, a satisfactory end product is obtained.

If an abutting member substituting as the upper surface abutting member 271 is abutted against the lower surface 2b, the slag 2f interferes with the abutting member, thereby impairing the smooth movement of the machining unit 20. In this embodiment, even at the time of machining of the lower edge 2d, the machining unit 20 can be moved smoothly without any influence of the slag 2f by abutting the upper surface abutting member 271 against the upper surface 2a.

During machining of the lower edge 2d, the driving unit 28 is extended to bias the movable plate 22 upward, as shown in the state ST34 in FIG. 12. This can always press the machining portion 253 upward against the lower edge 2d, and the lower edge 2d can be machined more reliably. When chamfering of the lower edge 2d ends, the moving apparatus 30 moves the machining unit 20 to another machining target portion, and the same processing is repeated.

As described above, in this embodiment, the upper edge 2c and the lower edge 2d can be successively machined without replacing the rotating tool 25 or flipping the work 2, and the edges of both the surfaces of the plate-like work 2 can be machined efficiently. By arranging the machining portions 252 and 253 of the rotating tool 25 as in this embodiment, as compared with an opposite arrangement, the full length of the rotating tool 25 can be shortened, and the vertical moving stroke of the rotating tool 25 when switching the machining target between the upper edge 2c and the lower edge 2d can also be shortened. This contributes to improvement of the machining efficiency. Furthermore, in machining of each of the upper edge 2c and the lower edge 2d, it is possible to eliminate the influence of the slag 2f by abutting the upper surface abutting member 271 against the upper surface 2a of the work 2. When switching between machining of the upper edge 2c and that of the lower edge 2d, it is only necessary to vertically move the upper surface abutting member 271. This also contributes to improvement of the machining efficiency.

Other Embodiments

Figure 20A:
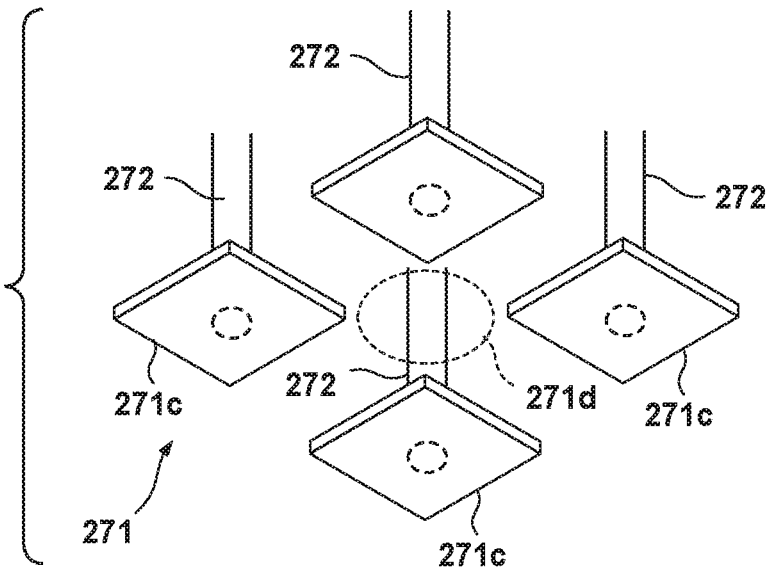
FIGS. 20A to 20C are explanatory views of other examples of an upper surface abutting member.
Figure 20B:
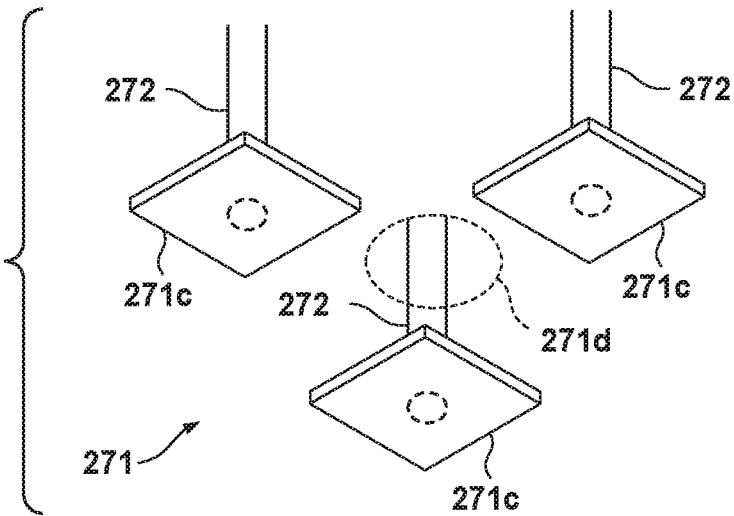
Figure 20C:
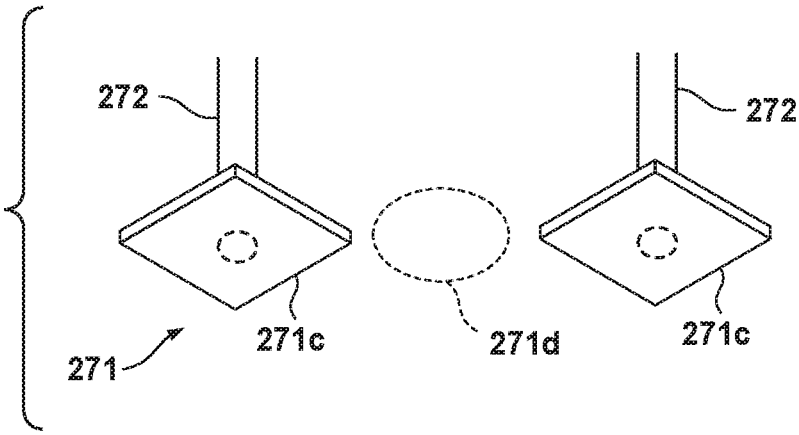

In the above-described embodiment, one plate-like member is used as the upper surface abutting member 271, and a circular hole is formed as the insertion portion 271b. However, other arrangements can be adopted. FIGS. 20A to 20C show other examples.

In each of the examples shown in FIGS. 20A to 20C, an upper surface abutting member 271 is formed by a plurality of plate-like members 271c. An arrangement is adopted, in which the lower surfaces of the plate-like members 271c are flat and flush with each other on the horizontal plane, and abut against an upper surface 2a of a work 2. An insertion portion 271d is formed by a gap among the plate-like members 271c.

In the example of FIG. 20A, four plate-like members 271c are provided. Each plate-like member 271c is supported by a column member 272. The four column members 272 are arranged at an equal distance from the center of the insertion portion 271d (that is, the shaft center of a rotating tool 25) and at an equal angular pitch θ (90°) in the circumferential direction around the insertion portion 271d (that is, the rotating tool 25).

In the example of FIG. 20B, three plate-like members 271c are provided. Each plate-like member 271c is supported by a column member 272. The three column members 272 are arranged at an equal distance from the center of the insertion portion 271d and at an equal angular pitch θ (120° in the circumferential direction around the insertion portion 271d.

In the example of FIG. 20C, two plate-like members 271c are provided. Each plate-like member 271c is supported by a column member 272. The two column members 272 are arranged at an equal distance from the center of the insertion portion 271d and at an equal angular pitch θ (180°) in the circumferential direction around the insertion portion 271d.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A machining system comprising:
a machining unit configured to machine an upper edge and a lower edge of a planar work held in a horizontal orientation; and
a moving apparatus including a motor as a driving source and configured to move the machining unit,
the machining unit comprising
a rotating tool configured to rotate about an axis in a vertical direction and machine the work,
an upper surface abutting member configured to be abutted against an upper surface of the work when machining the work by the rotating tool,
an end face abutting member configured to be abutted against an end face of the work between the upper edge and the lower edge when machining the work by the rotating tool, and
a vertical moving unit including a motor as a driving source and configured to change a position of the upper surface abutting member in the vertical direction with respect to the rotating tool, and
the rotating tool comprising
a machining portion main body,
a first machining portion provided on a lower side of the machining portion main body and configured to machine the upper edge of the work, and
a second machining portion provided on an upper side of the machining portion main body and configured to machine the lower edge of the work,
wherein the upper surface abutting member is a member including an insertion portion into which the rotating tool is inserted,
the insertion portion comprises a hole,
the upper surface abutting member includes an abutting portion abutted against the upper surface of the work, and
the abutting portion projects downward from a lower surface of the upper surface abutting member and is annular so as to surround the insertion portion, the abutting portion having a lower end that has a semicircular sectional shape.

2. The system according to claim 1, wherein the end face abutting member comprises
a first end face abutting member supported by the machining portion main body on an upper side of the second machining portion, and
a second end face abutting member supported by the machining portion main body on a lower side of the first machining portion.

3. The system according to claim 1, further comprising:
a sensor configured to measure a plate thickness of the work; and
a control unit including a processor and a storage device and configured to control a position of the upper surface abutting member with respect to the rotating tool by vertically moving the vertical moving unit based on a measurement result of the sensor.

4. The system according to claim 1, wherein
the vertical moving unit includes a plurality of column members configured to support the upper surface abutting member,
the plurality of column members are arranged at an equal angular pitch in a circumferential direction around the rotating tool.

5. The system according to claim 1, wherein a size or diameter of the abutting portion is arranged so that an abutting position, where the annular abutting portion abuts against the upper surface of the work, is spaced apart from the upper edge of the work.

6. A machining system comprising:
a machining unit configured to machine an upper edge and a lower edge of a planer work held in a horizontal orientation; and
a moving apparatus configured to move the machining unit,
the machining unit comprising
a rotating tool configured to rotate about an axis in a vertical direction and machine the work,
an upper surface abutting member configured to be abutted against an upper surface of the work when machining the work by the rotating tool,
an end face abutting member configured to be abutted against an end face of the work between the upper edge and the lower edge when machining the work by the rotating tool, and
a vertical moving unit configured to change a position of the upper surface abutting member in the vertical direction with respect to the rotating tool, and
the rotating tool comprising
a machining portion main body,
a first machining portion provided on a lower side of the machining portion main body and configured to machine the upper edge of the work, and
a second machining portion provided on an upper side of the machining portion main body and configured to machine the lower edge of the work,
wherein the upper surface abutting member is a member including an insertion portion into which the rotating tool is inserted,
the upper surface abutting member comprises at least two planar members each having a flat lower surface abutted against the upper surface of the work, and
the insertion portion comprises a gap between the planar members.

7. The system according to claim 6, wherein the end face abutting member comprises
a first end face abutting member supported by the machining portion main body on an upper side of the second machining portion, and
a second end face abutting member supported by the machining portion main body on a lower side of the first machining portion.

8. The system according to claim 6, further comprising:
a sensor configured to measure a plate thickness of the work; and
a control unit configured to control a position of the upper surface abutting member with respect to the rotating tool by vertically moving the vertical moving unit based on a measurement result of the sensor.

9. The system according to claim 6, wherein
the vertical moving unit includes a plurality of column members configured to support the upper surface abutting member,
the plurality of column members are arranged at an equal angular pitch in a circumferential direction around the rotating tool.

10. A machining method of machining a planar work held in a horizontal orientation by moving a machining unit while abutting the machining unit against an upper edge and a lower edge of the work,
the machining unit comprising
a rotating tool configured to rotate about an axis in a vertical direction and machine the work,
an upper surface abutting member configured to be abutted against an upper surface of the work when machining the work by the rotating tool,
an end face abutting member configured to be abutted against an end face of the work between the upper edge and the lower edge when machining the work by the rotating tool, and
a vertical moving unit including a motor as a driving source and configured to change a position of the upper surface abutting member in the vertical direction with respect to the rotating tool, and
the rotating tool comprising
a machining portion main body,
a first machining portion provided on a lower side of the machining portion main body and configured to machine the upper edge of the work, and
a second machining portion provided on an upper side of the machining portion main body and configured to machine the lower edge of the work,
the upper surface abutting member being a member including an insertion portion into which the rotating tool is inserted,
the insertion portion comprising a hole,
the upper surface abutting member including an abutting portion abutted against the upper surface of the work, and
the abutting portion projecting downward from a lower surface of the upper surface abutting member and being annular so as to surround the insertion portion, the abutting portion having a lower end that has a semi-circular sectional shape,
the method comprising:
machining the upper edge by the first machining portion while abutting the upper surface abutting member against the upper surface of the work;
changing a relative position in the vertical direction between the abutting portion of the upper surface abutting member and the second machining portion of the rotating tool by driving the vertical moving unit; and
machining the lower edge by the second machining portion while keeping the abutting portion of the upper surface abutting member abutted against the upper surface of the work.

11. A machining method of machining a planer work held in a horizontal orientation by moving a machining unit while abutting the machining unit against an upper edge and a lower edge of the work,
the machining unit comprising
a rotating tool configured to rotate about an axis in a vertical direction and machine the work,
an upper surface abutting member configured to be abutted against an upper surface of the work when machining the work by the rotating tool,
an end face abutting member configured to be abutted against an end face of the work between the upper edge and the lower edge when machining the work by the rotating tool, and
a vertical moving unit including a motor as a driving source and configured to change a position of the upper surface abutting member in the vertical direction with respect to the rotating tool, and
the rotating tool comprising
a machining portion main body,
a first machining portion provided on a lower side of the machining portion main body and configured to machine the upper edge of the work, and a second machining portion provided on an upper side of the machining portion main body and configured to machine the lower edge of the work, the upper surface abutting member being a member including an insertion portion into which the rotating tool is inserted, the upper surface abutting member comprising at least two planer members each having a flat lower surface abutted against the upper surface of the work, and the insertion portion comprising a gap between the planer members, the method comprising:

machining the upper edge by the first machining portion while abutting the upper surface abutting member against the upper surface of the work;

changing a relative position in the vertical direction between the upper surface abutting member and the second machining portion of the rotating tool by driving the vertical moving unit; and machining the lower edge by the second machining portion while keeping the upper surface abutting member abutted against the upper surface of the work.

\* \* \* \* \*